US 8,611,666 B2

(12) United States Patent
Komaki

(10) Patent No.: US 8,611,666 B2
(45) Date of Patent: Dec. 17, 2013

(54) DOCUMENT IMAGE PROCESSING APPARATUS, DOCUMENT IMAGE PROCESSING METHOD, AND COMPUTER-READABLE RECORDING MEDIUM HAVING RECORDED DOCUMENT IMAGE PROCESSING PROGRAM

(75) Inventor: Yoshio Komaki, Nishinomiya (JP)

(73) Assignee: Konica Minolta Business Technologies, Inc. (JP)

( * ) Notice: Subject to any disclaimer, the term of this patent is extended or adjusted under 35 U.S.C. 154(b) by 838 days.

(21) Appl. No.: 12/727,311

(22) Filed: Mar. 19, 2010

(65) Prior Publication Data

US 2010/0245875 A1    Sep. 30, 2010

(30) Foreign Application Priority Data

Mar. 27, 2009   (JP) ................................ 2009-080167

(51) Int. Cl.
 *G06K 9/46* (2006.01)
 *G06K 9/34* (2006.01)

(52) U.S. Cl.
 USPC .......................................... 382/190; 382/180

(58) Field of Classification Search
 None
 See application file for complete search history.

(56) References Cited

U.S. PATENT DOCUMENTS

| 4,813,010 | A | * | 3/1989 | Okamoto et al. | 715/259 |
|---|---|---|---|---|---|
| 5,689,342 | A | * | 11/1997 | Nakatsuka | 358/296 |
| 5,748,805 | A | * | 5/1998 | Withgott et al. | 382/306 |
| 5,892,842 | A | * | 4/1999 | Bloomberg | 382/173 |
| 6,728,403 | B1 | * | 4/2004 | Jang et al. | 382/180 |
| 7,860,316 | B2 | * | 12/2010 | Ohk | 382/194 |
| 2002/0034328 | A1 | * | 3/2002 | Naoi et al. | 382/176 |
| 2003/0042319 | A1 | * | 3/2003 | Moore | 235/494 |
| 2003/0156754 | A1 | * | 8/2003 | Ouchi | 382/176 |
| 2007/0048715 | A1 | * | 3/2007 | Miyamoto et al. | 434/308 |
| 2007/0196015 | A1 | * | 8/2007 | Meunier et al. | 382/190 |
| 2008/0170786 | A1 | * | 7/2008 | Tomizawa et al. | 382/176 |

(Continued)

FOREIGN PATENT DOCUMENTS

| JP | 8-88755 A | 4/1996 |
|---|---|---|
| JP | 9-297765 A | 11/1997 |

(Continued)

OTHER PUBLICATIONS

Lin, C., Niwa, Y., and Narita, S., Logical Structure Analysis of Book Document Images Using Contents Information, 1997, Proceedings of the Fourth International Conference on Document Analysis and Recognition, 1997., vol. 2, pp. 1048-1054.*

Notice of Grounds of Rejection for Japanese Patent Application No. 2009-080167, with English translation, mailed Feb. 19, 2013.

*Primary Examiner* — Stephen R Koziol
*Assistant Examiner* — Jonathan S Lee
(74) *Attorney, Agent, or Firm* — Cantor Colburn LLP

(57) ABSTRACT

Each small region positioned just before a large region according to a reading order is determined as a first candidate, and an evaluating process to evaluate whether each first candidate is an index or not is performed based on a difference in feature from the related large region with respect to each first candidate. Each small region positioned just before a first index according to the reading order is determined as a second candidate, and an evaluating process to evaluate whether each second candidate is the index or not is performed based on a difference in feature from the related first index with respect to each second candidate. Small regions determined as the first index and the second index are extracted as index regions.

12 Claims, 38 Drawing Sheets

(56) References Cited

U.S. PATENT DOCUMENTS

| | | | |
|---|---|---|---|
| 2008/0240619 A1* | 10/2008 | Kanawa | 382/305 |
| 2009/0110288 A1* | 4/2009 | Fujiwara | 382/190 |
| 2009/0169061 A1* | 7/2009 | Anderson et al. | 382/114 |
| 2009/0169110 A1* | 7/2009 | Masuyama et al. | 382/198 |
| 2010/0198827 A1* | 8/2010 | Yacoub et al. | 707/739 |

FOREIGN PATENT DOCUMENTS

| | | |
|---|---|---|
| JP | 11-250041 A | 9/1999 |
| JP | 2000-251067 A | 9/2000 |
| JP | 2006-350867 A | 12/2006 |
| JP | 2008-305088 A | 12/2008 |

\* cited by examiner

| PAGE NUMBER | REGION UPPER LEFT COORDINATES | REGION LOWER RIGHT COORDINATES | ELEMENT TYPE |
|---|---|---|---|
| 1 | (50,100) | (60,800) | INDEX |
| ... | ... | ... | ... |
| | | | |
| | | | |
| | | | |

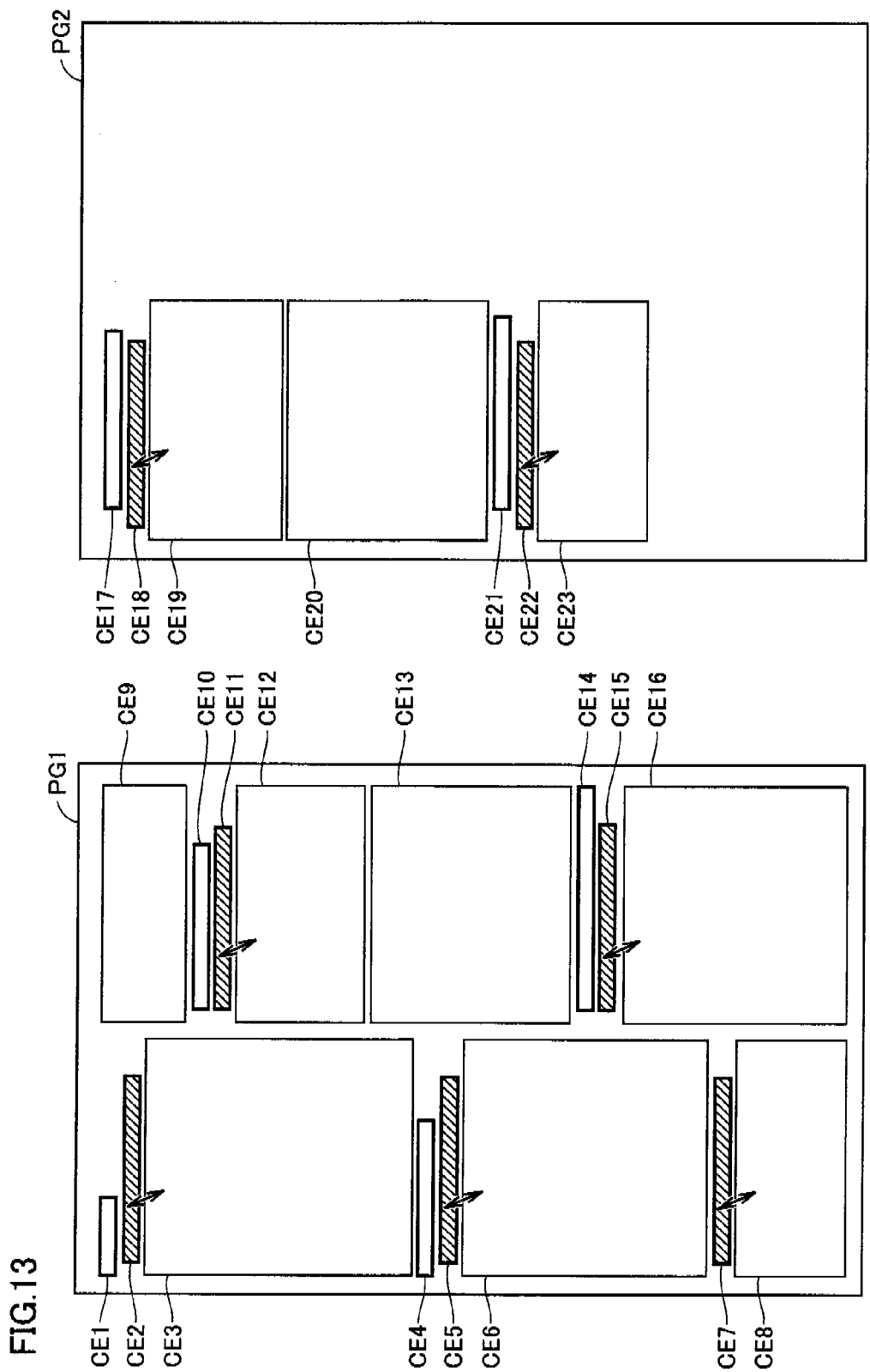

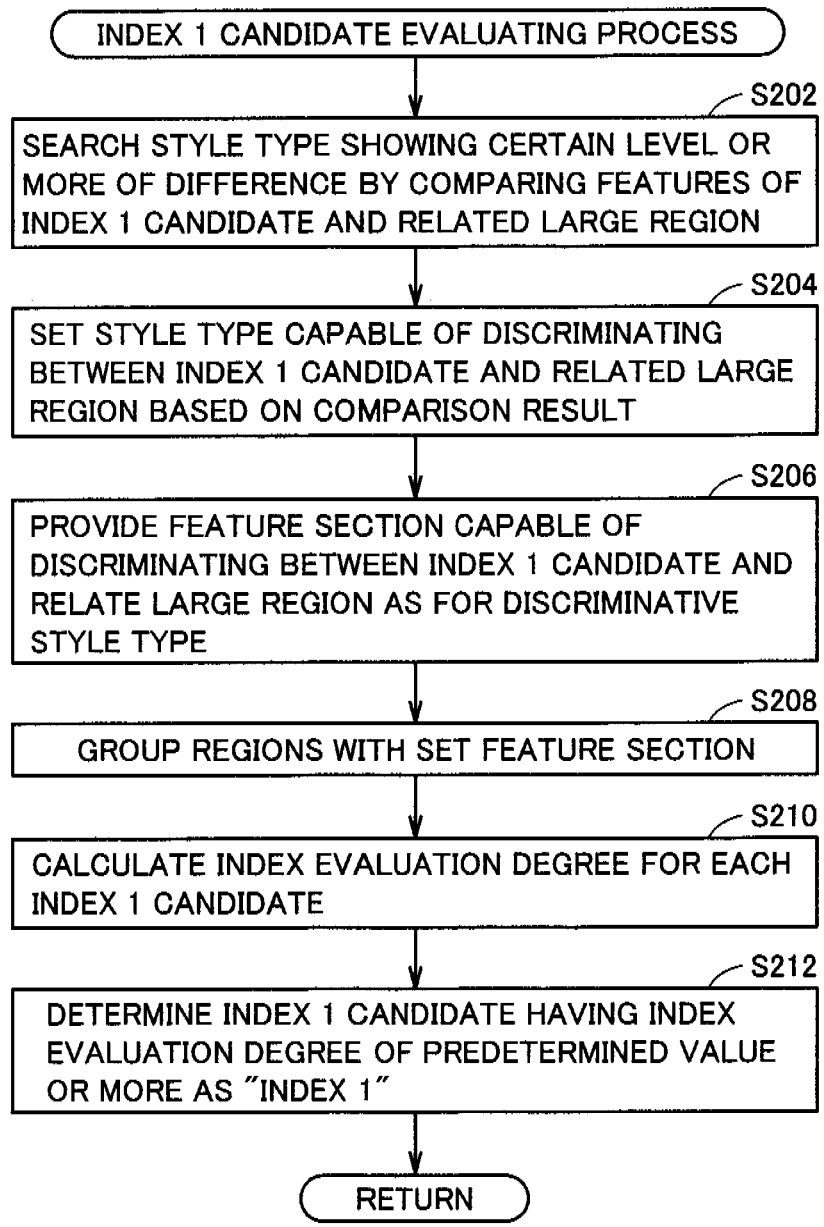

FIG.15

| SMALL REGION A OF INDEX 1 CANDIDATE | RELATED LARGE REGION B | RESULT OF COMPARISON IN FEATURE BETWEEN REGION A AND REGION B | | | | | DISCRIMINATIVE STYLE TYPE |
|---|---|---|---|---|---|---|---|
| | | LINE HEIGHT | INDENT AMOUNT | HEAD-OF-LINE CHARACTER KIND | CHARACTER COLOR | | |
| 2 | 3 | NO SIGNIFICANT DIFFERENCE | CORRESPONDING TO ONE CHARACTER | ROMAN CHARACTER/ JAPANESE | NO SIGNIFICANT DIFFERENCE | | INDENT AMOUNT |
| 5 | 6 | NO SIGNIFICANT DIFFERENCE | CORRESPONDING TO ONE CHARACTER | ROMAN CHARACTER/ JAPANESE | NO SIGNIFICANT DIFFERENCE | | INDENT AMOUNT |
| 7 | 8 | NO SIGNIFICANT DIFFERENCE | CORRESPONDING TO ONE CHARACTER | ROMAN CHARACTER/ JAPANESE | NO SIGNIFICANT DIFFERENCE | | INDENT AMOUNT |
| 11 | 12 | NO SIGNIFICANT DIFFERENCE | CORRESPONDING TO ONE CHARACTER | ROMAN CHARACTER/ JAPANESE | NO SIGNIFICANT DIFFERENCE | | INDENT AMOUNT |
| 15 | 16 | NO SIGNIFICANT DIFFERENCE | CORRESPONDING TO ONE CHARACTER | ROMAN CHARACTER/ JAPANESE | NO SIGNIFICANT DIFFERENCE | | INDENT AMOUNT |
| 18 | 19 | NO SIGNIFICANT DIFFERENCE | CORRESPONDING TO ONE CHARACTER | ROMAN CHARACTER/ JAPANESE | NO SIGNIFICANT DIFFERENCE | | INDENT AMOUNT |
| 22 | 23 | NO SIGNIFICANT DIFFERENCE | CORRESPONDING TO ONE CHARACTER | ROMAN CHARACTER/ JAPANESE | NO SIGNIFICANT DIFFERENCE | | INDENT AMOUNT |

FIG.16

| SMALL REGION A OF INDEX 1 CANDIDATE | RELATED LARGE REGION B | DISCRIMINATIVE STYLE TYPE | SET FEATURE SECTION | |
|---|---|---|---|---|
| | | | SECTION INCLUDING INDEX 1 CANDIDATE A | SECTION INCLUDING LARGE REGION |
| 2 | 3 | INDENT AMOUNT | [0.5, 1.5] | OTHER THAN THAT LISTED LEFT |
| 5 | 6 | INDENT AMOUNT | [0.5, 1.5] | OTHER THAN THAT LISTED LEFT |
| 7 | 8 | INDENT AMOUNT | [0.5, 1.5] | OTHER THAN THAT LISTED LEFT |
| 11 | 12 | INDENT AMOUNT | [0.5, 1.5] | OTHER THAN THAT LISTED LEFT |
| 15 | 16 | INDENT AMOUNT | [0.5, 1.5] | OTHER THAN THAT LISTED LEFT |
| 18 | 19 | INDENT AMOUNT | [0.5, 1.5] | OTHER THAN THAT LISTED LEFT |
| 22 | 23 | INDENT AMOUNT | [0.5, 1.5] | OTHER THAN THAT LISTED LEFT |

FEATURE SECTION INCLUDING INDEX 1 CANDIDATE
[0.5, 1.5]

FIG.20

| SMALL REGION A OF INDEX 1 CANDIDATE | RELATED LARGE REGION B | SECTION INCLUDING INDEX 1 CANDIDATE A | | SECTION INCLUDING LARGE REGION | |
|---|---|---|---|---|---|
| | | NUMBER OF INCLUDED INDEX 1 CANDIDATES | NUMBER OF INCLUDED LARGE REGIONS | NUMBER OF INCLUDED INDEX 1 CANDIDATES | NUMBER OF INCLUDED LARGE REGIONS |
| 2 | 3 | 7 | 0 | 0 | 10 |
| 5 | 6 | 7 | 0 | 0 | 10 |
| 7 | 8 | 7 | 0 | 0 | 10 |
| 11 | 12 | 7 | 0 | 0 | 10 |
| 15 | 16 | 7 | 0 | 0 | 10 |
| 18 | 19 | 7 | 0 | 0 | 10 |
| 22 | 23 | 7 | 0 | 0 | 10 |

FIG.21

| SMALL REGION A OF INDEX 1 CANDIDATE | RELATED LARGE REGION B | INDEX EVALUATION DEGREE | DETERMINATION OF INDEX 1 |
|---|---|---|---|
| 2 | 3 | 10 | TRUE |
| 5 | 6 | 10 | TRUE |
| 7 | 8 | 10 | TRUE |
| 11 | 12 | 10 | TRUE |
| 15 | 16 | 10 | TRUE |
| 18 | 19 | 10 | TRUE |
| 22 | 23 | 10 | TRUE |

FIG.24

| SMALL REGION A OF INDEX 2 CANDIDATE | RELATED INDEX 1B | RESULT OF COMPARISON IN FEATURE BETWEEN REGION A AND REGION B | | | | | DISCRIMINATIVE STYLE TYPE |
|---|---|---|---|---|---|---|---|
| | | LINE HEIGHT | INDENT AMOUNT | HEAD-OF-LINE CHARACTER KIND | CHARACTER COLOR | | |
| 1 | 2 | NO SIGNIFICANT DIFFERENCE | CORRESPONDING TO -ONE CHARACTER | NO SIGNIFICANT DIFFERENCE | NO SIGNIFICANT DIFFERENCE | | INDENT AMOUNT |
| 4 | 5 | NO SIGNIFICANT DIFFERENCE | CORRESPONDING TO -ONE CHARACTER | NO SIGNIFICANT DIFFERENCE | NO SIGNIFICANT DIFFERENCE | | INDENT AMOUNT |
| 10 | 11 | NO SIGNIFICANT DIFFERENCE | NO SIGNIFICANT DIFFERENCE | NUMBER/ ROMAN CHARACTER | NO SIGNIFICANT DIFFERENCE | | HEAD-OF-LINE CHARACTER KIND |
| 14 | 15 | NO SIGNIFICANT DIFFERENCE | NO SIGNIFICANT DIFFERENCE | NUMBER/ ROMAN CHARACTER | NO SIGNIFICANT DIFFERENCE | | HEAD-OF-LINE CHARACTER KIND |
| 17 | 18 | NO SIGNIFICANT DIFFERENCE | CORRESPONDING TO TWO CHARACTERS | NUMBER/ ROMAN CHARACTER | NO SIGNIFICANT DIFFERENCE | | INDENT AMOUNT |
| 21 | 22 | NO SIGNIFICANT DIFFERENCE | CORRESPONDING TO TWO CHARACTERS | NUMBER/ ROMAN CHARACTER | NO SIGNIFICANT DIFFERENCE | | INDENT AMOUNT |

FIG.25

| SMALL REGION A OF INDEX 2 CANDIDATE | RELATED INDEX 1B | DISCRIMINATIVE STYLE TYPE | SET FEATURE SECTION ||
|---|---|---|---|---|
| | | | SECTION INCLUDING INDEX 2 CANDIDATE A | SECTION INCLUDING INDEX 1 |
| 1 | 2 | INDENT AMOUNT | [-0.5, +1.5] | OTHER THAN THAT LISTED LEFT |
| 4 | 5 | INDENT AMOUNT | [-0.5, +1.5] | OTHER THAN THAT LISTED LEFT |
| 10 | 11 | HEAD-OF-LINE CHARACTER KIND | NUMBER | OTHER THAN NUMBER |
| 14 | 15 | HEAD-OF-LINE CHARACTER KIND | NUMBER | OTHER THAN NUMBER |
| 17 | 18 | INDENT AMOUNT | [1, +3] | OTHER THAN THAT LISTED LEFT |
| 21 | 22 | INDENT AMOUNT | [1, +3] | OTHER THAN THAT LISTED LEFT |

FIG.26

| SMALL REGION A OF INDEX 2 CANDIDATE | RELATED INDEX 1B | SECTION INCLUDING INDEX 2 CANDIDATE A | | SECTION INCLUDING INDEX 1 | |
|---|---|---|---|---|---|
| | | NUMBER OF INDEX 2 CANDIDATES | NUMBER OF INCLUDED INDEXES 1 | NUMBER OF INDEX 2 CANDIDATES | NUMBER OF INCLUDED INDEXES 1 |
| 1 | 2 | 2 | 0 | 4 | 8 |
| 4 | 5 | 2 | 0 | 4 | 8 |
| 10 | 11 | 4 | 0 | 2 | 8 |
| 14 | 15 | 4 | 0 | 2 | 8 |
| 17 | 18 | 2 | 0 | 4 | 8 |
| 21 | 22 | 2 | 0 | 4 | 8 |

FIG.27

| SMALL REGION A OF INDEX 2 CANDIDATE | INDEX EVALUATION DEGREE | DETERMINATION OF INDEX 2 |
|---|---|---|
| 1 | 4.2 | TRUE |
| 4 | 4.2 | TRUE |
| 10 | 7.1 | TRUE |
| 14 | 7.1 | TRUE |
| 17 | 4.2 | TRUE |
| 21 | 4.2 | TRUE |

FIG.31

| SMALL REGION A OF INDEX 2 CANDIDATE | RELATED INDEX 1B | RESULT OF COMPARISON IN FEATURE BETWEEN REGION A AND REGION B | | | | DISCRIMINATIVE STYLE TYPE |
|---|---|---|---|---|---|---|
| | | LINE HEIGHT | INDENT AMOUNT | HEAD-OF-LINE CHARACTER KIND | CHARACTER COLOR | |
| 1a | 2a | NO SIGNIFICANT DIFFERENCE | CORRESPONDING TO -ONE CHARACTER | VOL/JAPANESE | NO SIGNIFICANT DIFFERENCE | INDENT AMOUNT |
| 4a | 5a | NO SIGNIFICANT DIFFERENCE | CORRESPONDING TO -ONE CHARACTER | VOL/JAPANESE | NO SIGNIFICANT DIFFERENCE | INDENT AMOUNT |
| 10a | 11a | NO SIGNIFICANT DIFFERENCE | NO SIGNIFICANT DIFFERENCE | NUMBER/ROMAN CHARACTER | NO SIGNIFICANT DIFFERENCE | HEAD-OF-LINE CHARACTER KIND |
| 14a | 15a | NO SIGNIFICANT DIFFERENCE | CORRESPONDING TO -ONE CHARACTER | JAPANESE/ROMAN CHARACTER | NO SIGNIFICANT DIFFERENCE | INDENT AMOUNT |
| 17a | 18a | NO SIGNIFICANT DIFFERENCE | CORRESPONDING TO TWO CHARACTERS | NUMBER/ROMAN CHARACTER | NO SIGNIFICANT DIFFERENCE | INDENT AMOUNT |
| 21a | 22a | NO SIGNIFICANT DIFFERENCE | CORRESPONDING TO TWO CHARACTERS | NUMBER/ROMAN CHARACTER | NO SIGNIFICANT DIFFERENCE | INDENT AMOUNT |

FIG.32

| SMALL REGION A OF INDEX 2 CANDIDATE | RELATED LARGE REGION B | RESULT OF COMPARISON IN FEATURE BETWEEN REGION A AND REGION B ||||| DISCRIMINATIVE STYLE TYPE |
|---|---|---|---|---|---|---|
| | | LINE HEIGHT | INDENT AMOUNT | HEAD-OF-LINE CHARACTER KIND | CHARACTER COLOR | |
| 1a | 3a | NO SIGNIFICANT DIFFERENCE | NO SIGNIFICANT DIFFERENCE | VOL/JAPANESE | NO SIGNIFICANT DIFFERENCE | HEAD-OF-LINE CHARACTER KIND |
| 4a | 6a | NO SIGNIFICANT DIFFERENCE | NO SIGNIFICANT DIFFERENCE | VOL/JAPANESE | NO SIGNIFICANT DIFFERENCE | HEAD-OF-LINE CHARACTER KIND |
| 10a | 12a | NO SIGNIFICANT DIFFERENCE | CORRESPONDING TO -ONE CHARACTER | NUMBER/ JAPANESE | NO SIGNIFICANT DIFFERENCE | INDENT AMOUNT |
| 14a | 16a | NO SIGNIFICANT DIFFERENCE | NO SIGNIFICANT DIFFERENCE | NO SIGNIFICANT DIFFERENCE | NO SIGNIFICANT DIFFERENCE | NONE |
| 17a | 19a | NO SIGNIFICANT DIFFERENCE | CORRESPONDING TO THREE CHARACTERS | NUMBER/ JAPANESE | NO SIGNIFICANT DIFFERENCE | INDENT AMOUNT |
| 21a | 23a | NO SIGNIFICANT DIFFERENCE | CORRESPONDING TO THREE CHARACTERS | NUMBER/ JAPANESE | NO SIGNIFICANT DIFFERENCE | INDENT AMOUNT |

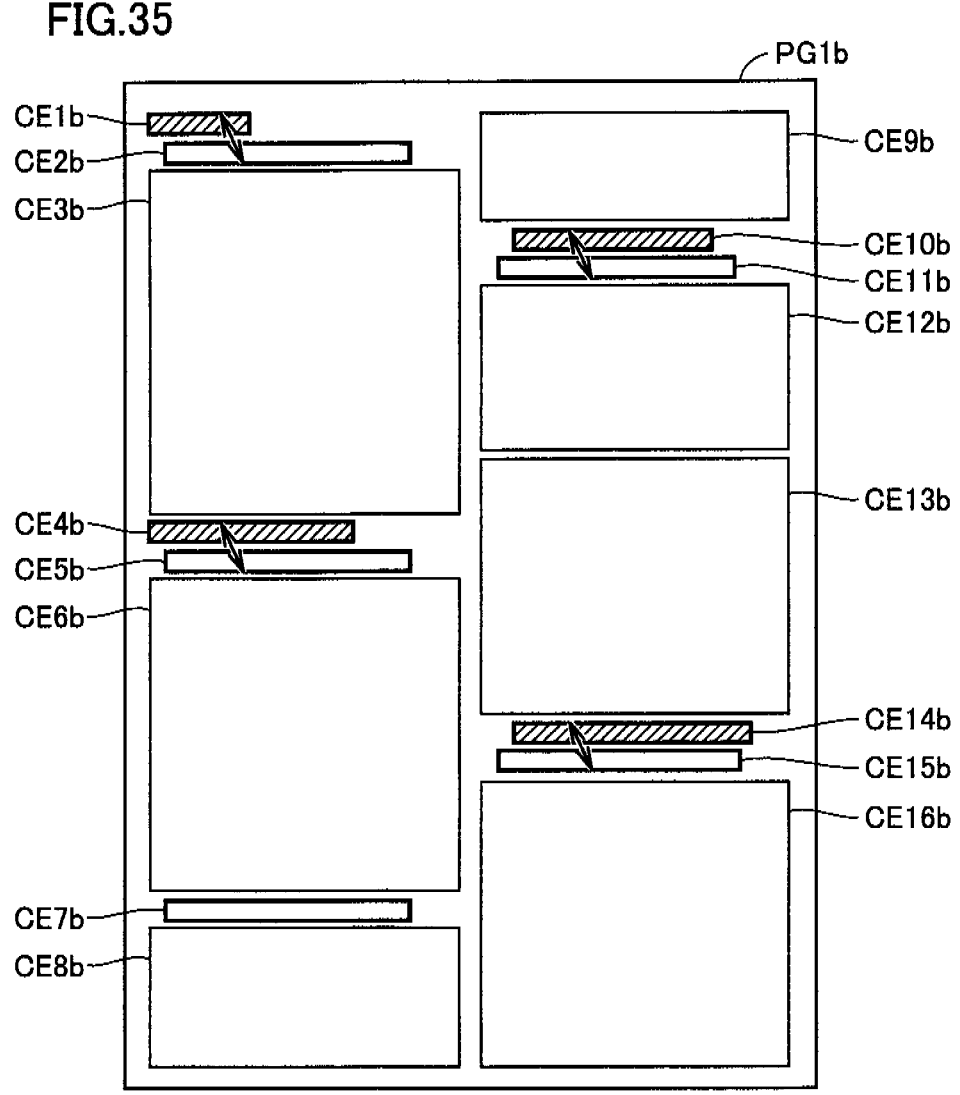

FIG.36

| SMALL REGION A OF INDEX 2 CANDIDATE | RELATED INDEX 1B | RESULT OF COMPARISON IN FEATURE BETWEEN REGION A AND REGION B | | | | DISCRIMINATIVE STYLE TYPE |
|---|---|---|---|---|---|---|
| | | LINE HEIGHT | INDENT AMOUNT | HEAD-OF-LINE CHARACTER KIND | CHARACTER COLOR | |
| 1b | 2b | NO SIGNIFICANT DIFFERENCE | CORRESPONDING TO −ONE CHARACTER | NO SIGNIFICANT DIFFERENCE | NO SIGNIFICANT DIFFERENCE | INDENT AMOUNT |
| 4b | 5b | NO SIGNIFICANT DIFFERENCE | CORRESPONDING TO −ONE CHARACTER | NO SIGNIFICANT DIFFERENCE | NO SIGNIFICANT DIFFERENCE | INDENT AMOUNT |
| 10b | 11b | NO SIGNIFICANT DIFFERENCE | CORRESPONDING TO +ONE CHARACTER | NO SIGNIFICANT DIFFERENCE | NO SIGNIFICANT DIFFERENCE | INDENT AMOUNT |
| 14b | 15b | NO SIGNIFICANT DIFFERENCE | CORRESPONDING TO +TWO CHARACTERS | NO SIGNIFICANT DIFFERENCE | NO SIGNIFICANT DIFFERENCE | INDENT AMOUNT |

FIG.37

| SMALL REGION A OF INDEX 2 CANDIDATE | RELATED INDEX 1B | DISCRIMINATIVE STYLE TYPE | SET FEATURE SECTION | |
|---|---|---|---|---|
| | | | SECTION INCLUDING INDEX 2 CANDIDATE A | SECTION INCLUDING INDEX 1 |
| 1b | 2b | INDENT AMOUNT | [−0.5, +0.5] | OTHER THAN THAT LISTED LEFT |
| 4b | 5b | INDENT AMOUNT | [−0.5, +0.5] | OTHER THAN THAT LISTED LEFT |
| 10b | 11b | INDENT AMOUNT | [+1.5, +2.5] | OTHER THAN THAT LISTED LEFT |
| 14b | 15b | INDENT AMOUNT | [+2.5, +3.5] | OTHER THAN THAT LISTED LEFT |

FIG.38

| SMALL REGION A OF INDEX 2 CANDIDATE | SECTION INCLUDING INDEX 2 CANDIDATE A | | SECTION INCLUDING INDEX 1 | |
|---|---|---|---|---|
| | NUMBER (REGION) OF INCLUDED INDEX 2 CANDIDATES | NUMBER OF INCLUDED INDEXES 1 | NUMBER (REGION) OF INCLUDED INDEX 2 CANDIDATES | NUMBER OF INCLUDED INDEXES 1 |
| 1b | 2(1, 4) | 0 | 2 | 5 |
| 4b | 1(1, 4) | 0 | 3 | 5 |
| 10b | 1(10) | 0 | 3 | 5 |
| 14b | 1(14) | 0 | 3 | 5 |

FIG.39

| SMALL REGION A OF INDEX 2 CANDIDATE | INDEX EVALUATION DEGREE | DETERMINATION OF INDEX 2 |
|---|---|---|
| 1b | 10 | TRUE |
| 4b | 10 | TRUE |
| 10b | 10 | TRUE |
| 14b | 10 | TRUE |

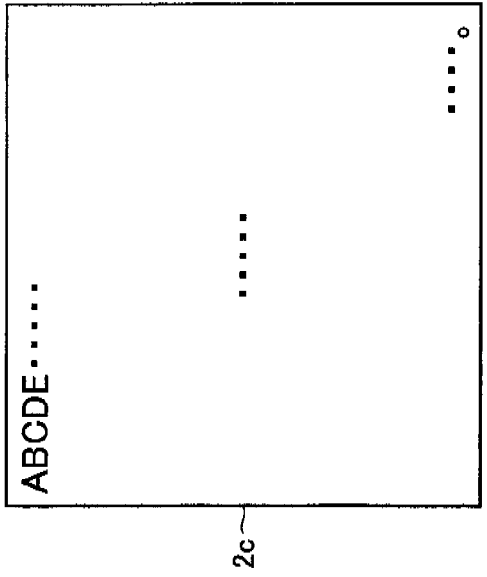
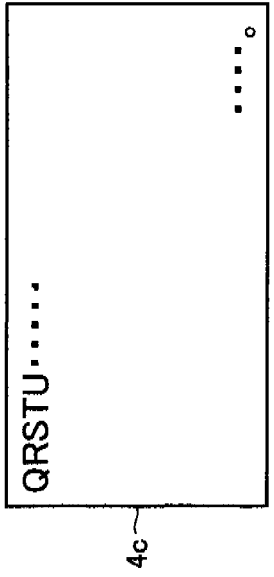
FIG.41A
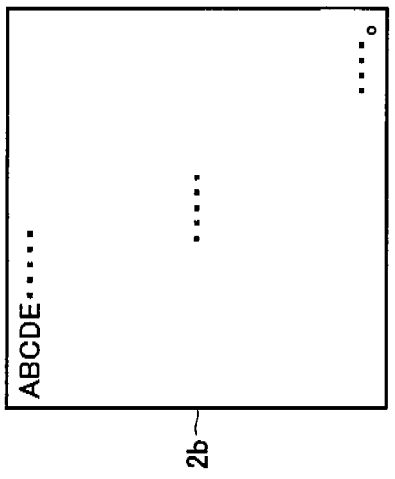
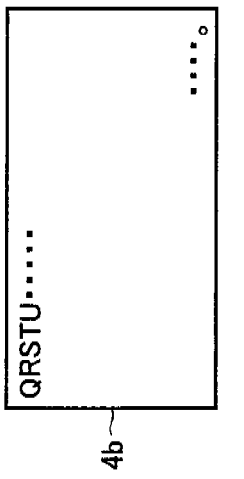
FIG.41B
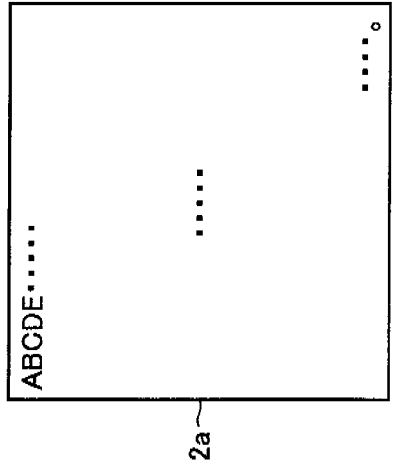
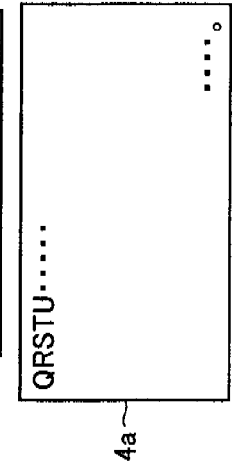
FIG.41C

DOCUMENT IMAGE PROCESSING APPARATUS, DOCUMENT IMAGE PROCESSING METHOD, AND COMPUTER-READABLE RECORDING MEDIUM HAVING RECORDED DOCUMENT IMAGE PROCESSING PROGRAM

This application is based on Japanese Patent Application No. 2009-080167 filed with the Japan Patent Office on Mar. 27, 2009, the entire content of which is hereby incorporated by reference.

BACKGROUND OF THE INVENTION

1. Field of the Invention

The present invention relates to a document image processing apparatus, a document image processing method, and a computer-readable recording medium having a recorded document image processing program and more particularly, to a document image processing apparatus, a document image processing method, and a computer-readable recording medium having a recorded document image processing program, in which an index region can be extracted from a document image.

2. Description of the Related Art

Conventionally, there is a technique to extract an index part without being limited by a specific format. For example, Japanese Laid-Open Patent Publication No. 2000-251067 discloses an embodiment in which a character block is classified to an index and text according to a character size, and the classified index and text are related.

However, there are many documents having no definite difference in character size between the text and the index, so that such documents cannot be classified to the index and the text based on the character size.

In addition, there are many documents in which indexes having no uniformity in attribute are sequentially arranged. In such documents, index regions cannot be appropriately extracted without needing user handling by a conventional technique.

SUMMARY OF THE INVENTION

The present invention was made to solve the above problem and it is an object of the present invention to provide a document image processing apparatus, a document image processing method, and a computer-readable recording medium having a recorded document image processing program, in which index regions can be automatically extracted without needing user handling from a document image having sequentially arranged indexes.

A document image processing apparatus according to an aspect of the present invention includes a memory for storing a document image, and a controller for controlling extraction of an index region from the document image. The controller is configured to i) classify a plurality of character string element regions constituting the document image into small regions and large regions, ii) determine each small region positioned just before the large region according to a reading order as a first candidate, as a first determining process, iii) determine at least one part of the first candidates as a first index, by performing an evaluating process to evaluate whether or not each first candidate is an index, based on a difference in feature from the related large region, with respect to each first candidate, as a first evaluating process, iv) determine each small region positioned just before the first index according to the reading order as a second candidate, as a second determining process, v) determine at least one part of the second candidates as a second index, by performing an evaluating process to evaluate whether or not the second candidate is the index, based on a difference in feature from the related first index, with respect to each second candidate, as a second evaluating process, and vi) extract the small regions determined as the first index and the second index, as the index region.

Preferably, in the first evaluating process, the controller sets a first feature section for each said first candidate as for a style type different in feature from a corresponding related large region that represents said related large region corresponding to the intended first candidate among a plurality of style types, groups at least one or both of the related large regions and the first candidates having the feature included in the set first feature section, calculates a first index evaluation degree, based on a size of each region group with respect to each first candidate, and determines whether or not a logical element of each first candidate is the index, based on the calculated first index evaluation degree. Then, in the second evaluating process, the controller sets a second feature section for each second candidate as for a style type different in feature from a corresponding related first index that represents the related first index corresponding to the intended second candidate among the plurality of style types, the second feature section including a feature of the intended second candidate region but not including a feature of the corresponding related first index, groups at least one or both of the related first indexes and the second candidates having the feature included in the set second feature section, calculates a second index evaluation degree, based on a size of each region group with respect to each second candidate, and determines whether or not a logical element of each second candidate is the index, based on the calculated second index evaluation degree.

Preferably, in the second evaluating process, the controller groups both of the related first indexes and the second candidates having the feature included in the second feature section, with respect to each second candidate, and calculates the second index evaluation degree, based on the sizes of a first index group and a second candidate group.

Preferably, in the second evaluating process, the controller further groups at least one of the related first indexes and the second candidates having a feature not included in the second feature section, with respect to each second candidate, and uses a size of each region group not included in the second feature section in calculating the second evaluation degree.

Preferably, the controller further changes the second feature section when there is no difference in value in the second index evaluation degree provided with respect to each second candidate in setting the second feature section in the second evaluating process.

Preferably, a plurality of style types include any one of an indent amount, a justified line, distances from previous and next character string element regions, a character string decoration, a head character kind, an end character kind, a language type, a character size, a line height, a character interval, a font, a character decoration, a character color, and a background color.

Preferably, in the second evaluating process, the controller sets a predetermined range around a feature value of the intended second candidate as the second feature section.

Preferably, in the second evaluating process, the controller sets a boundary point between a feature value of the intended second candidate and a feature value of the corresponding related first index, and sets the second feature section so as to include the side of the feature value of the intended second candidate from the boundary point.

Preferably, in the second evaluating process, the controller further compares features of the small region determined as the second index and other small regions, and determines the small region having a feature similar to that of the determined small region among the other small regions, as a new second index.

Preferably, when the second index is extracted, the controller repeats the second determining process and the second evaluating process by replacing the second index with the first index.

Preferably, in the second evaluating process, the controller compares features of the intended second candidate and the related large region regarding the related first index corresponding to the intended second candidate, with respect to each second candidate, and removes the second candidate having a feature similar to the feature of the related large region, from an index candidate.

A document image processing method according to another aspect of the present invention is executed by a document image processing apparatus including a memory storing a document image, to extract an index region from the document image stored in the memory, and includes a step of classifying a plurality of character string element regions constituting the document image into small regions and large regions, a step of determining each small region positioned just before the large region according to a reading order as a first candidate, a step of determining at least one part of the first candidates as a first index, by performing an evaluating process to evaluate whether or not each first candidate is an index, based on a difference in feature from the related large region, with respect to each first candidate, a step of determining each small region positioned just before the first index according to the reading order as a second candidate, a step of determining at least one part of the second candidates as a second index, by performing an evaluating process to evaluate whether or not the second candidate is the index, based on a difference in feature from the related first index, with respect to each second candidate, and a step of extracting the small regions determined as the first index and the second index, as the index region.

A computer-readable recording medium according to still another aspect of the present invention has a recorded document image processing program including a step of classifying a plurality of character string element regions constituting a document image into small regions and large regions, a step of determining each small region positioned just before the large region according to a reading order as a first candidate, a step of determining at least one part of the first candidates as a first index, by performing an evaluating process to evaluate whether or not each first candidate is an index, based on a difference in feature from the related large region, with respect to each first candidate, a step of determining each small region positioned just before the first index according to the reading order as a second candidate, a step of determining at least one part of the second candidates as a second index, by performing an evaluating process to evaluate whether or not the second candidate is the index, based on a difference in feature from the related first index, with respect to each second candidate, and a step of extracting the small regions determined as the first index and the second index, as the index region.

According to the present invention, even when the small regions are sequentially arranged, whether each small region is an index or not can be determined based on the difference in feature between them, with respect to each hierarchy provided based on the large region. Therefore, the index region can be extracted with high accuracy without needing the user handling from various styles of document images such as a document including hierarchized indexes.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a view showing a relationship between a first candidate (index 1 candidate) and a large region related to the first candidate.

FIG. 14 is a flowchart showing an index first candidate evaluating process in the embodiment of the present invention.

FIG. 15 is a view showing an example of style type set with respect to each index 1 candidate and capable of discriminating from the large region.

FIG. 16 is a view showing an example of feature section set with respect to each index 1 candidate.

FIG. 20 is a view showing one example of a result grouped with the feature section with respect to each index 1 candidate.

FIG. 21 is a view showing an index evaluation degree and an index determination result with respect to each index 1 candidate.

FIG. 24 is a view showing an example of a style type set with respect to each index 2 candidate and capable of discriminating from the index 1 according to the embodiment of the present invention.

FIG. 25 is a view showing an example of a feature section set with respect to each index 2 candidate according to the embodiment of the present invention.

FIG. 26 is a view showing an example of a result grouped with the feature section with respect to each index 2 candidate according to the embodiment of the present invention.

FIG. 27 is a view showing an index evaluation degree and an index determination result with respect to each index 2 candidate according to the embodiment of the present invention.

FIG. 31 is a view showing an example of a style type set with respect to each index 2 candidate and capable of discriminating from the index 1 according to the variation 1 of the embodiment of the present invention.

FIG. 32 is a view showing an example of a style type set with respect to each index 2 candidate and capable of discriminating from the related large region according to the variation 1 of the embodiment of the present invention.

FIG. 35 is a view showing a relationship between an index 2 candidate and an index 1 related to the index 2 candidate according to the variation 2 of the embodiment of the present invention.

FIG. 36 is a view showing an example of a style type set with respect to each index 2 candidate and capable of discriminating from the index 1 according to the variation 2 of the embodiment of the present invention.

FIG. 37 is a view showing an example of a feature section set with respect to each index 2 candidate according to the variation 2 of the embodiment of the present invention.

FIG. 38 is a view showing an example of a result grouped with the feature section with respect to each index 2 candidate according to the variation 2 of the embodiment of the present invention.

FIG. 39 is a view showing an index evaluation degree and an index determination result with respect to each index 2 candidate according to the variation 2 of the embodiment of the present invention.

FIGS. 41A to 41C are views to described a conventional method of extracting an index region, and showing examples of a plurality of document styles having different character sizes.

DESCRIPTION OF THE PREFERRED EMBODIMENTS

Figure 1:
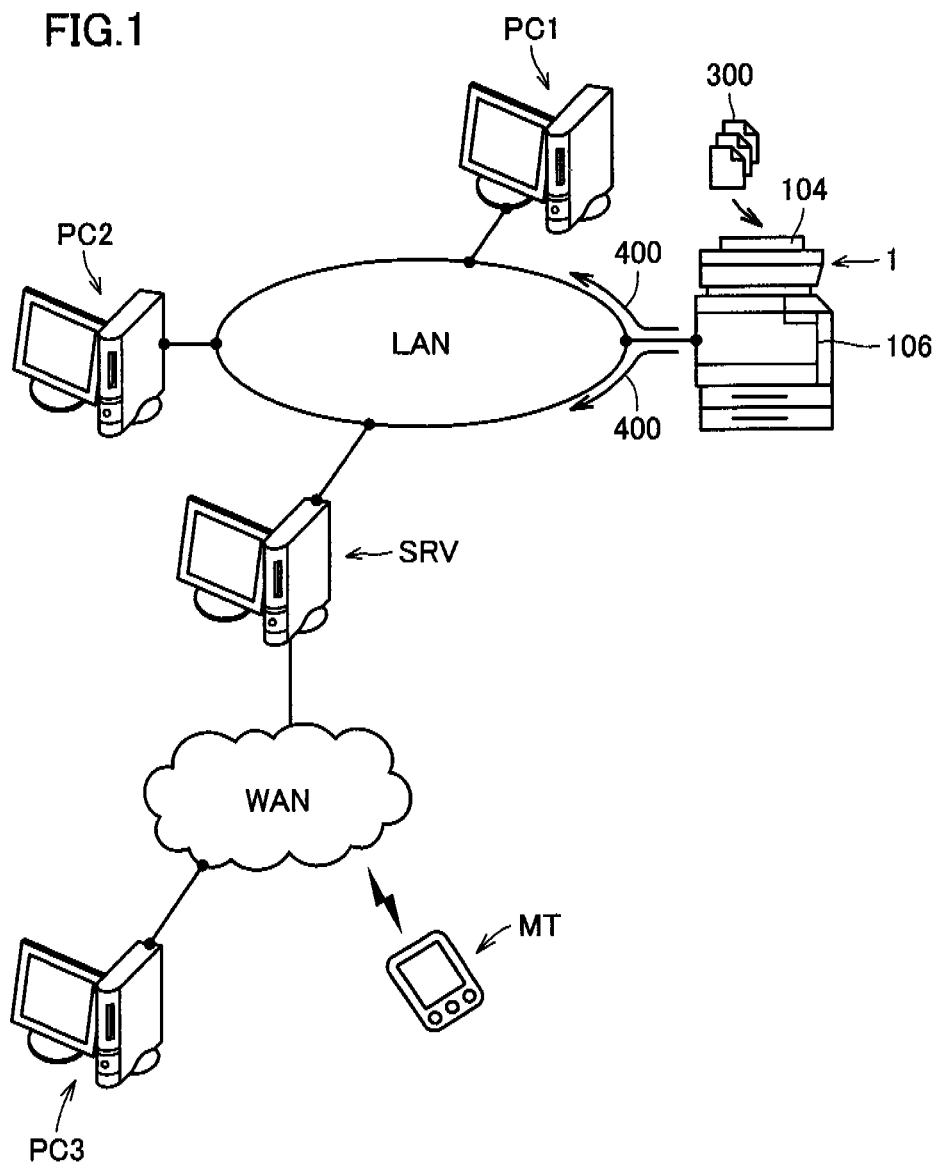
FIG. 1 is a schematic configuration view of a system including a document image processing apparatus according to an embodiment of the present invention.

An embodiment of the present invention will be described in detail with reference to the drawings. In addition, the same reference is given to the same or corresponding part and a description thereof is not repeated.

Prior to the description of the embodiment of the present invention, with reference to FIGS. 41 to 46, a description will be made of a conventionally existing typical method of extracting an index part.

Conventionally, there is a technique (referred to as "conventional example 1" hereinafter) to extract an index region (index part) by allocating an index level to a previously provided feature section. In addition, there is a technique (referred to as "conventional example 2" hereinafter) to extract the index region by grouping regions having a similar feature and then allocating an index level to the group.

FIG. 41A shows an example in which a character size in regions 1a and 3a corresponding to the index is larger than a character size in regions 2a and 4a corresponding to the text. FIG. 41B shows an example in which a character size in regions 1b and 3b corresponding to the index is the same as a character size in regions 2b and 4b corresponding to the text. FIG. 41C shows an example in which a character size in regions 1c and 3c corresponding to the index is smaller than a character size in regions 2c and 4c corresponding to the text. In addition, in the case of a character style in FIG. 41A, the character size in region 3a is larger than the character size in region 1a although both belong to the same index.

In the case of the above styles, a reader can determine the index part easily.

Figure 42:
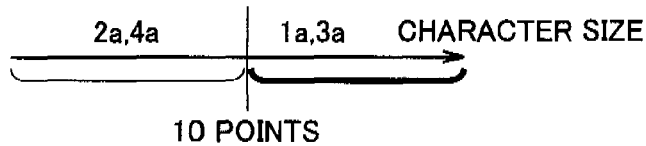
FIG. 42 is a view to describe a conventional method of extracting the index region, and showing an example when the index region is extracted from the document image in FIG. 41A using a specific character size.

According to the conventional example 1, a feature section is provided such that a region having a specific size of 10 points or more is determined to be the index, and a region having a size less than 10 points are determined to be not the index. In this case, as shown in FIG. 42, regions 1*a* and 3*a* can be correctly extracted as the index in the document shown in FIG. 41A.

Figure 43:
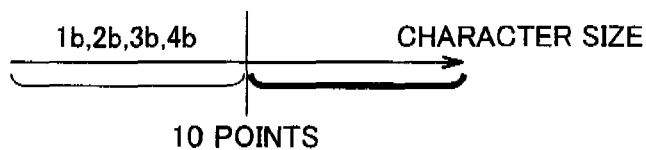
FIG. 43 is a view to describe a conventional method of extracting the index region, and showing an example when the index region is extracted from the document image in FIG. 41B using a specific character size.
Figure 44:
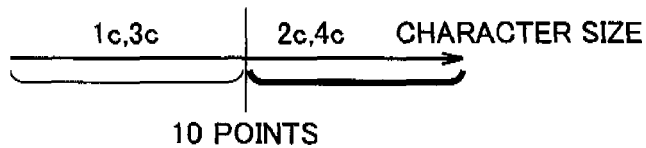
FIG. 44 is a view to describe a conventional method of extracting the index region, and showing an example when the index region is extracted from the document image in FIG. 41C using a specific character size.

However, as shown in FIGS. 43 and 44, with this feature section, the index cannot be correctly extracted in the character styles in FIGS. 41B and 41C because the size of the index part is small.

Figure 45:
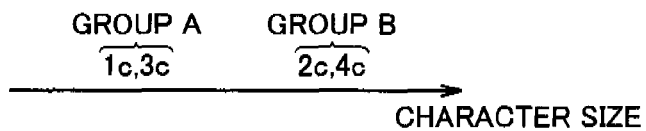
FIG. 45 is a view to describe a conventional method of extracting the index region, and showing an example when the index region is extracted from the document image in FIG. 41C by grouping the character sizes.

According to the conventional example 2, the regions having the similar feature are grouped and then the index is determined. As shown in FIG. 45, in the case of the character style in FIG. 41C, the character sizes are grouped into groups A and B. According to the conventional example 2, the index can be correctly extracted by determining the group whose position is higher or number of lines is smaller as the index.

Figure 46:
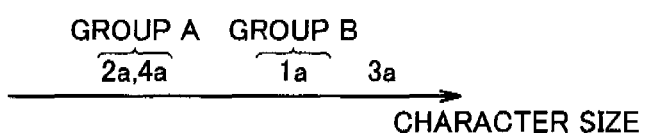
FIG. 46 is a view to describe a conventional method of extracting the index region, and showing an example when the index region is extracted from the document image in FIG. 41A by grouping the character sizes.

However, there may be a case where the character size differs between regions 1*a* and 3*a* corresponding to the index like the character style in FIG. 41A. In this case, the indexes cannot be grouped into one as shown in FIG. 46 by the conventional example 2, so that the index cannot be correctly extracted.

According to the above conventional methods, since the used style type (character size, for example) and the feature quantity (10 points, for example) are fixedly set, the index cannot be correctly extracted in some cases. For example, in the conventional example 1, the index could be correctly extracted by discriminating between the types (English/Number/Japanese, for example) of a head character in the first line in addition to the character size, and in the conventional example 2, the index could be correctly extracted by increasing a range of the feature quantity of a group B so as to include regions 1 and 3.

Thus, according to this embodiment, a plurality of style types are used, and a feature section is dynamically set.

In addition, the term "style type" includes an indent amount, justified line, distances from previous and next character string element regions, character string decoration (underline and frame), character kind (head or end), language type, character size, line height, character interval, font, character decoration (thick character and italic character), character color, and background color. In order to extract the index region with accuracy, it is preferable to use at least the indent amount, the feature quantity regarding the size (character size or line height, for example) of the character, and the head character kind in the first line among the above types. In addition, the style type includes various kinds of types which can be discriminated by the reader and available in the document preparation tool.

In addition, the term "feature section" represents a feature value or range with respect to each style type, which is used to discriminate the index region from the other region. In addition, the "feature" may be put into "attribution" of the region itself, the line and character in the region.

<Configuration>
(Entire System Configuration)

According to this embodiment, a description will be made of a MFP (Multi Function Peripheral) representatively as one embodiment of a document image processing apparatus according to the present invention. In addition, the document image processing apparatus according to the present invention is not limited to the MFP and can be applied to a copying apparatus, facsimile apparatus, and scanner apparatus.

Referring to FIG. 1, a MFP1 according to this embodiment includes an image reader 104 for reading a manuscript 300, and a printer 106 for performing a printing process onto a paper medium.

Especially, MFP1 according to this embodiment obtains a document image by reading manuscript 300 with image reader 104, and generates a computerized document 400 containing this document image. Representatively, a format such as PDF (Portable Document Format) can be employed in computerized document 400. In this case, MFP1 extracts at least one index region from the document image, and generates viewing navigation information to specify the position of the extracted index region in the document image.

The "viewing navigation information" means information to support the user to view the document image contained in the computerized document, and more specifically, means information to specify the position of the index region contained in the document image. Such viewing navigation information includes a "bookmark", "comment", "thread", and "link", and it may include a thumbnail (minified image) of the corresponding index region in addition to the information to specify the position of the index region. In this embodiment, a description will be made of a configuration using the bookmark as the representative example of the "viewing navigation information".

MFP1 stores generated computerized document 400 in a memory (not shown) of itself, and also transmits it to personal computers PC1, PC2, and PC3 (referred also to as "personal computer PC" collectively hereinafter), and a mobile terminal MT through the network. As representative usage, MFP1 directly transmits computerized document 400 to personal computers PC1 and PC2 connected to a LAN (Local Area Network) serving as the network provided in the same office as MFP1. On the other hand, a server apparatus SRV is provided at a connection point between the LAN and a WAN (Wide Area Network), and computerized document 400 is transmitted from MFP1 to personal computer PC3 positioned in an office apart from MFP1, through server apparatus SRV. Furthermore, computerized document 400 is transmitted from MFP1 to mobile terminal MT through the WAN, a public mobile telephone network, and a wireless network line (not shown) such as a wireless LAN. Here, server apparatus SRV representatively includes a mail server, FTP (File Transfer Protocol) server, Web server, and SMB server.

Image reader 104 includes a set tray for setting the manuscript, a manuscript contact glass, a conveyer automatically conveying the manuscript set in the set tray to the manuscript contact glass one by one, and a discharge tray for discharging the read manuscript (all of them are not shown). Thus, the plurality of manuscripts are sequentially read, whereby one computerized document 400 can be generated.

(Schematic Configuration of MFP)

Figure 2:
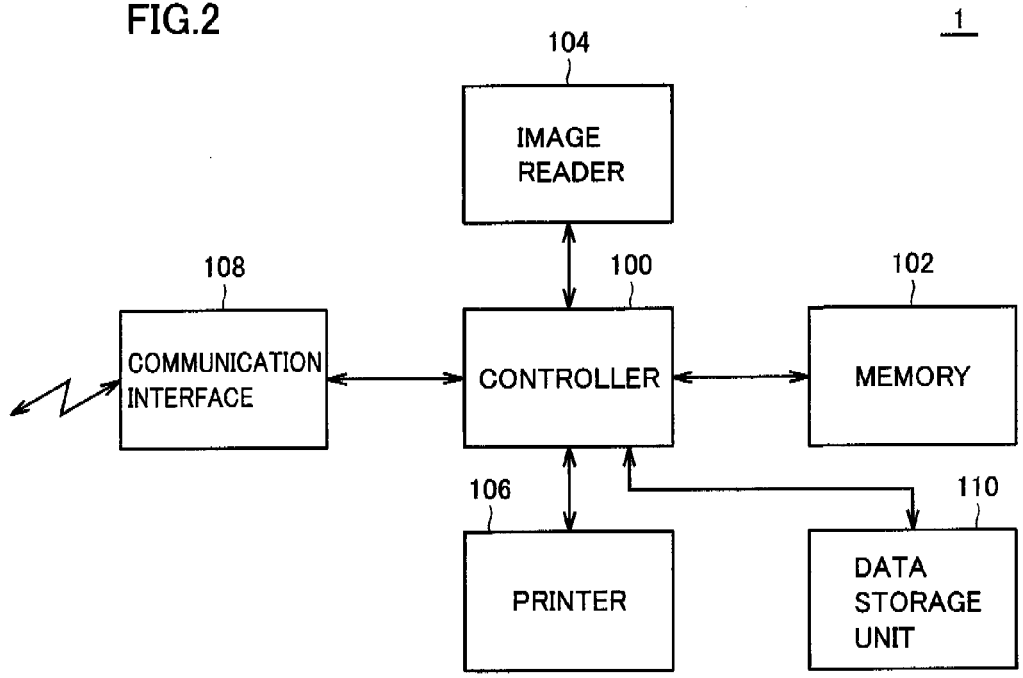
FIG. 2 is a block diagram showing a schematic configuration of the document image processing apparatus according to the embodiment of the present invention.

Referring to FIG. 2, MFP1 includes a controller 100, a memory 102, image reader 104, printer 106, a communication interface 108, and a data storage unit 110.

Controller 100 representatively includes a processing device such as a CPU (Central Processing Unit) and implements the document image processing according to this embodiment, by executing a program. Memory 102 is representatively a volatile memory device such as a DRAM (Dynamic Random Access Memory), and stores the program to be executed by controller 100 and data required to execute the program. Communication interface 108 is representatively a portion for transmitting and receiving data to and from personal computer PC (FIG. 1) and mobile terminal MT through the network (LAN shown in FIG. 1, for example), and includes a LAN adaptor and a driver software for controlling the LAN adaptor. Printer 106 is a portion for performing the printing process, and includes a control device for controlling each of the constituents in addition to a hardware configuration regarding the printing process. Data storage unit 110 is representatively a hard disk device and a nonvolatile memory device such as a flash memory, and stores computerized document 400 generated by controller 100.

(Configuration of Personal Computer)

Figure 3:
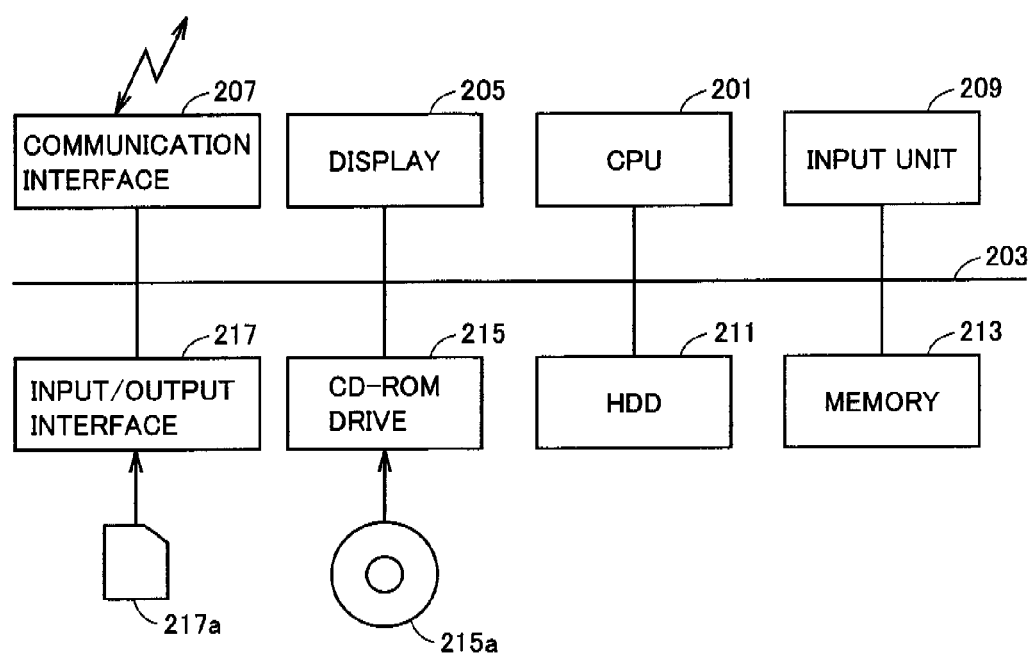
FIG. 3 is a block diagram showing a schematic configuration of a personal computer included in the system shown in FIG. 1.

Referring to FIG. 3, personal computer PC includes a CPU (Central Processing Unit) 201 executing various kinds of programs including an operating system (OS), a memory 213 temporally storing data required to execute the program by CPU 201, and a hard disk drive (HDD) 211 storing the program executed by CPU 201 in a nonvolatile manner. In addition, hard disk drive 211 stores a view application used for displaying the computerized document generated by MFP1, and such program is read from a memory card (SD card, for example) 217a or a CD-ROM (Compact Disk-Read Only Memory) 215 by an input/output interface 217 or a CD-ROM drive 215, respectively.

CPU 201 receives an instruction from a user through an input unit 209 such as a key board and a mouse, and also outputs a screen output generated by the program to a display 205. In addition, CPU 201 obtains the computerized document from MFP1 and server SRV (FIG. 1) connected to the LAN and WAN through a communication interface 207 including a LAN card, and stores it in hard disk drive 211. In addition, the above parts exchange data with each other through an internal bus 203.

In addition, since mobile terminal MT is almost equal to the one shown in FIG. 3 except for FDD drive 217 and CD-ROM drive 215, its detailed description will not be repeated.

(Functional Configuration of MFP)

Figure 4:
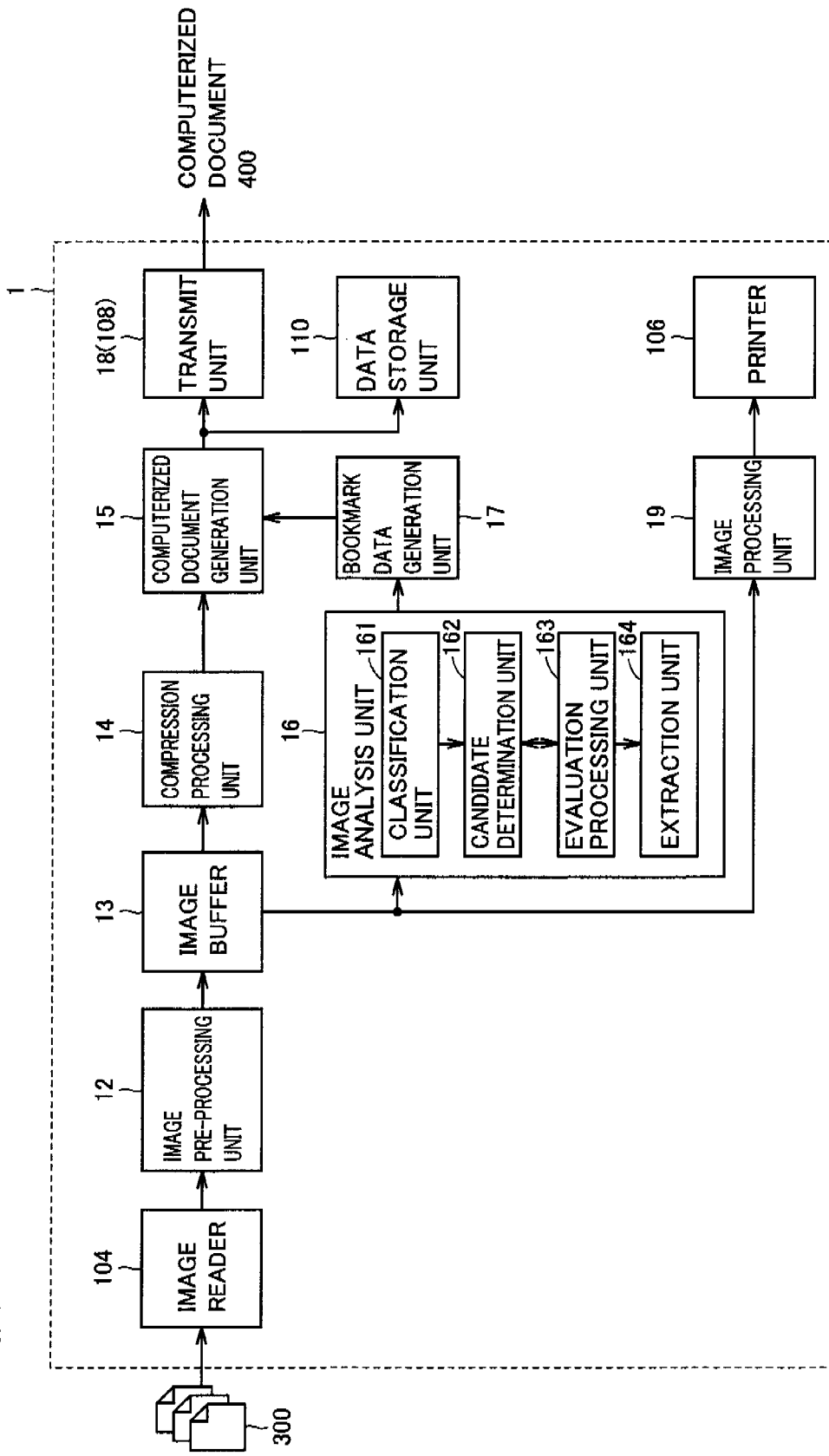
FIG. 4 is a block diagram showing a functional configuration in the document image processing apparatus according to the embodiment of the present invention.

Referring to FIG. 4, a functional configuration of MFP1 includes image reader 104, an image pre-processing unit 12, an image buffer 13, a compression processing unit 14, a computerize document generator 15, an image analysis unit 16, a bookmark data generation unit 17, a transmit unit 18, an image processor 19, and printer 106. The function of MFP1 is mainly implemented by controller 100 and memory 102 (FIG. 2) of MFP1.

Image reader 104 obtains the document image by reading manuscript 300, and outputs the document image to image pre-processing unit 12. Image pre-processing unit 12 adjusts display characteristics of the document image to make them suitable for the display mainly on personal computer PC. Furthermore, image pre-processing unit 12 may remove a noise contained in the document image. Thus, the document image processed by image pre-processing unit 12 is transmitted to image butter 13.

Image buffer 13 is a portion temporally storing the data of the obtained document image, and outputs the temporally stored document image to compression processing unit 14, image analysis unit 16, and image processor 19.

Compression processing unit 14 compresses the document image outputted from image butter 13, and outputs it to computerized document generation unit 15. The degree of compression by this compressing process may be changed based on the size of the generated computerized document and required resolution of the document image, and this compressing process may be irreversible conversion such as JPEG (Joint Photographic Experts Group). In addition, when high resolution is required, the compressing process may be omitted.

Image analysis unit 16 analyzes the document image outputted from image buffer 13 and extracts an index region. Image analysis unit 16 includes a classification unit 161, a candidate determination unit 162, an evaluation processing unit 163, and an extraction unit 164 as its function.

Classification unit 161 divides the document image into a plurality of character string element regions (to be described in detail below) and classifies the character string element regions into small regions and large regions. For example, classification unit 161 classifies them based on a size of the region (the number of lines, area, and the number of characters) and whether or not there is a specific character (character which are infrequently used as the index, period, and punctuation).

Candidate determination unit 162 determines the small region having a related large region, as a first index candidate (referred to as the "index 1 candidate" hereinafter) by comparing an arrangement relationship between the small region and the large region. The "related large region" means a large region subsequent to (just after) the index 1 candidate according to a reading order. That is, the index 1 candidate means the small region positioned just before the (related) large region according to the reading order.

Candidate determination unit 162 further determines the small region positioned just before a "first index" according to the reading order, as a second candidate (referred to as the "index 2 candidate" hereinafter). The "first index" means the small region determined as the index by evaluation processing unit 163 as will be described below, among the index 1 candidates. In addition, this small region is also referred to as the "index 1" in the following description.

As described above, while the index 2 candidate means the small region positioned just before the first index (index 1) according to the reading order, the term "positioned just before" in this embodiment includes not only a case where a region does not exist between the index 2 candidate and the first index, but also a case where a region such as an underline is provided between the index 2 candidate and the first index without preventing the relationship between both of them. In addition, the same is applied to the positional relationship between the index 1 candidate and the related large region.

Evaluation processing unit 163 performs an evaluating process to evaluate whether the index 1 candidate is the index or not, based on the difference in feature from the related large region, with respect to each index 1 candidate. Thus, evaluation processing unit 163 determines whether or not the index 1 candidate is the index, based on the evaluation result. In addition, evaluation processing unit 163 performs an evaluating process to evaluate whether the index 2 candidate is the index or not, based on the difference in feature from the related first index (index 1), with respect to each index 2 candidate. Thus, evaluation processing unit 163 determines whether or not the index 2 candidate is the index, based on the evaluation result.

According to this embodiment, until it is determined that there is no upper index candidate, that is, there is no small region just before the small region determined as the index, the above processes are repeated by candidate determination unit 162 and evaluation processing unit 163. More specifically, the small region determined as the index by evaluation processing unit 163 is expressed by a "second index" among the index 2 candidates. Then, the second index in the above description is replaced with (read as) the first index, and the processes are repeated by candidate determination unit 162 and evaluation processing unit 163.

A more specific processing example of evaluation processing unit 163 will be described below.

Extraction unit 164 extracts the small region determined as the index by evaluation processing unit 163, as the index region. Information (such as positional information) of the extracted index region is transmitted to bookmark data generation unit 17.

Bookmark data generation unit 17 generates bookmark data based on the index region information outputted from image analysis unit 16. In addition, bookmark data generation unit 17 may include a specific logical element (such as a drawing, chart, and caption) other than the index, in the bookmark data. Bookmark data generation unit 17 outputs the bookmark data to computerized document generation unit 15.

Computerized document generation unit 15 generates a computerized document by adding the bookmark data from bookmark data generation unit 17, to the document image compressed by compression processing unit 14. Thus, this generated computerized document is stored in data storage unit 110 or outputted to transmit unit 18, based on the setting by the user. Transmit unit 18 is implemented by communication interface 108, and transmits the computerized document generated by computerized document generation unit 15 to personal computer PC (FIG. 1) through the network such as the LAN.

On the other hand, image processor 19 converts the document image outputted from image buffer 13 to an image suitable for the printing operation by printer 106, in response to the user operation. Representatively, the document image defined by RGB display system is converted to image data of CMYK display system which is suitable for color printing. At this time, the color may be adjusted based on the characteristics of printer 106. Printer 106 performs a printing process onto a paper medium based on the image data outputted from image processor 19.

It should be noted that the operation of each functional block may be implemented by executing software stored in memory 102, or at least one of functional blocks may be implemented by hardware.

(Data Structure Example of Computerized Document)

Figures 5, 6:
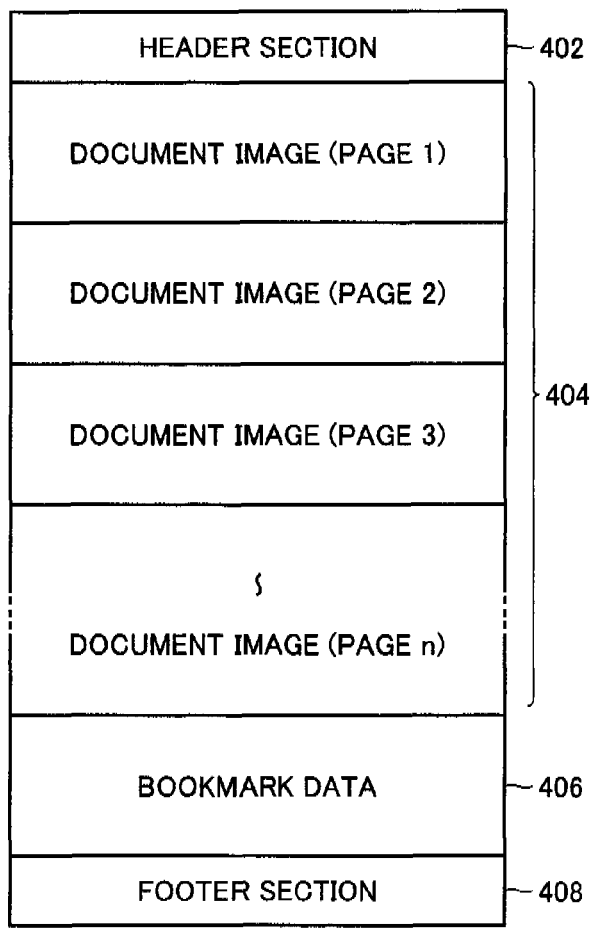
FIG. 5 is a view showing one example of a data structure of a computerized document generated by the document image processing apparatus according to the embodiment of the present invention.
FIG. 6 is a view showing one example of a data structure of a bookmark data included in the computerized document in the embodiment of the present invention.

Referring to FIG. 5, computerized document 400 includes a header section 402, a document image section 404, a bookmark data section 406, and a footer section 408. Header section 402 and footer section 408 stores information regarding the attribution of computerized document 400 such as generated date and time, creator, and copyright information. Document image section 404 stores the document image corresponding to each page. In addition, this document image may be stored in the compressed state as described above. Bookmark data section 406 stores the bookmark data for specifying the index region included in the document image, that is, the character string element region determined as the index.

Referring to FIG. 6, the bookmark data stores a page number, region upper-left coordinates, region lower-right coordinates, and an element type so as to relate them to each index region. The page number is positional information for specifying a page in which the corresponding index region exists. The region upper-left coordinates and the region lower-right coordinates are positional information for specifying a position (rectangle) of the corresponding index region in the page. In addition, the element type is information for specifying the type of the corresponding index region. In addition, the bookmark data may further include positional information of a type of document element (region) other than the index.

<About Operation>

The index region extracting process executed by image analysis unit 16 is the most characteristic process among the processes executed by MFP1. Therefore, the index region extracting process will be described in detail hereinafter.

With reference to a flowchart shown in FIG. 7, a description will be made of the index region extracting process according to this embodiment. The process shown in the flowchart in FIG. 7 is previously stored in memory 102 as a program, and the function of the index region extracting process is implemented when controller 100 reads and executes this program.

Figure 7:
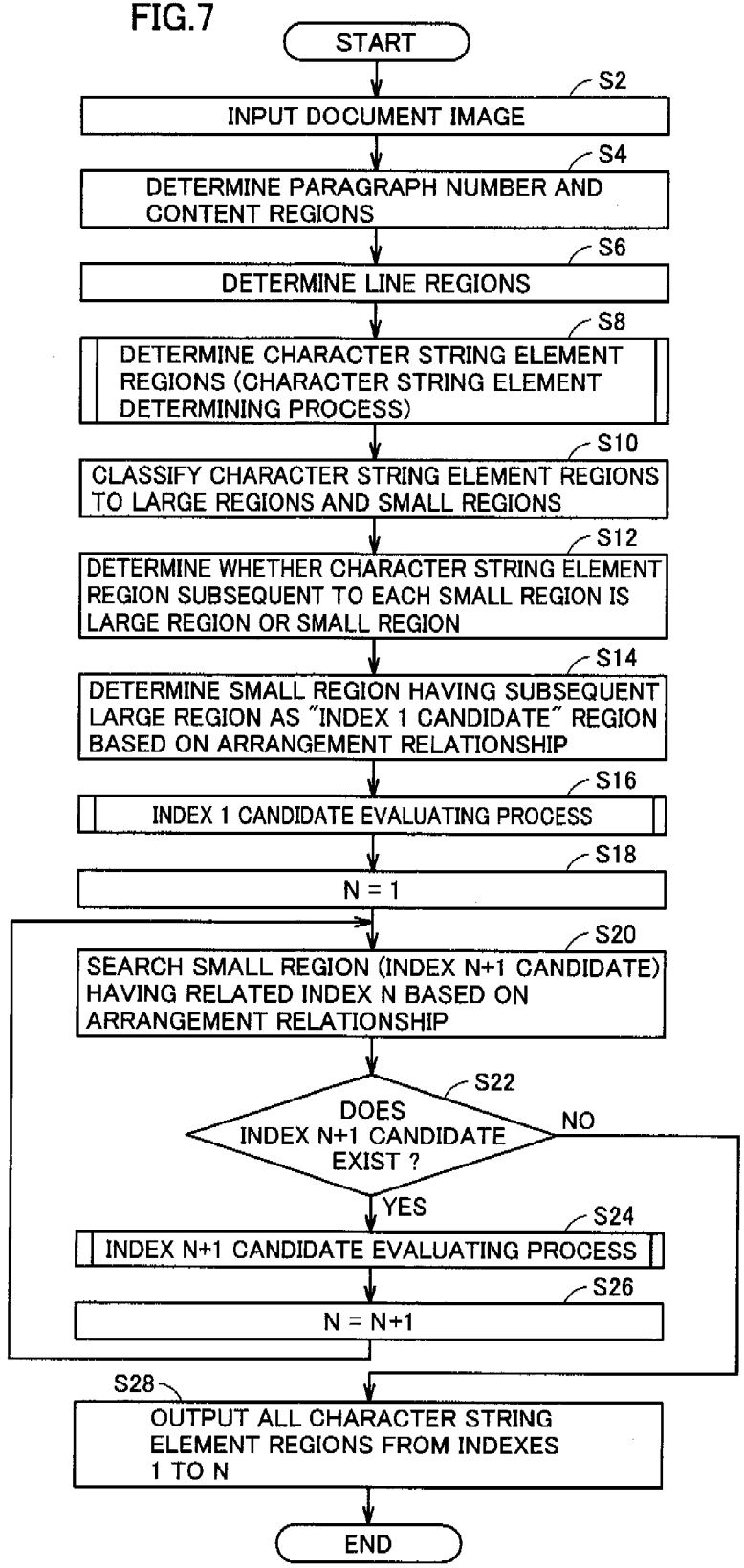
FIG. 7 is a flowchart showing an index region extracting process in the embodiment of the present invention.

Referring to FIG. 7, image analysis unit 16 inputs the data of the document image (step S2). The inputted data of the document image is stored in the internal memory with respect to each page.

Then, the data of each page in the internal memory is read and a content region is determined (step S4). The content region is a partial region of each page and each content region includes characters for one paragraph.

Figure 8:
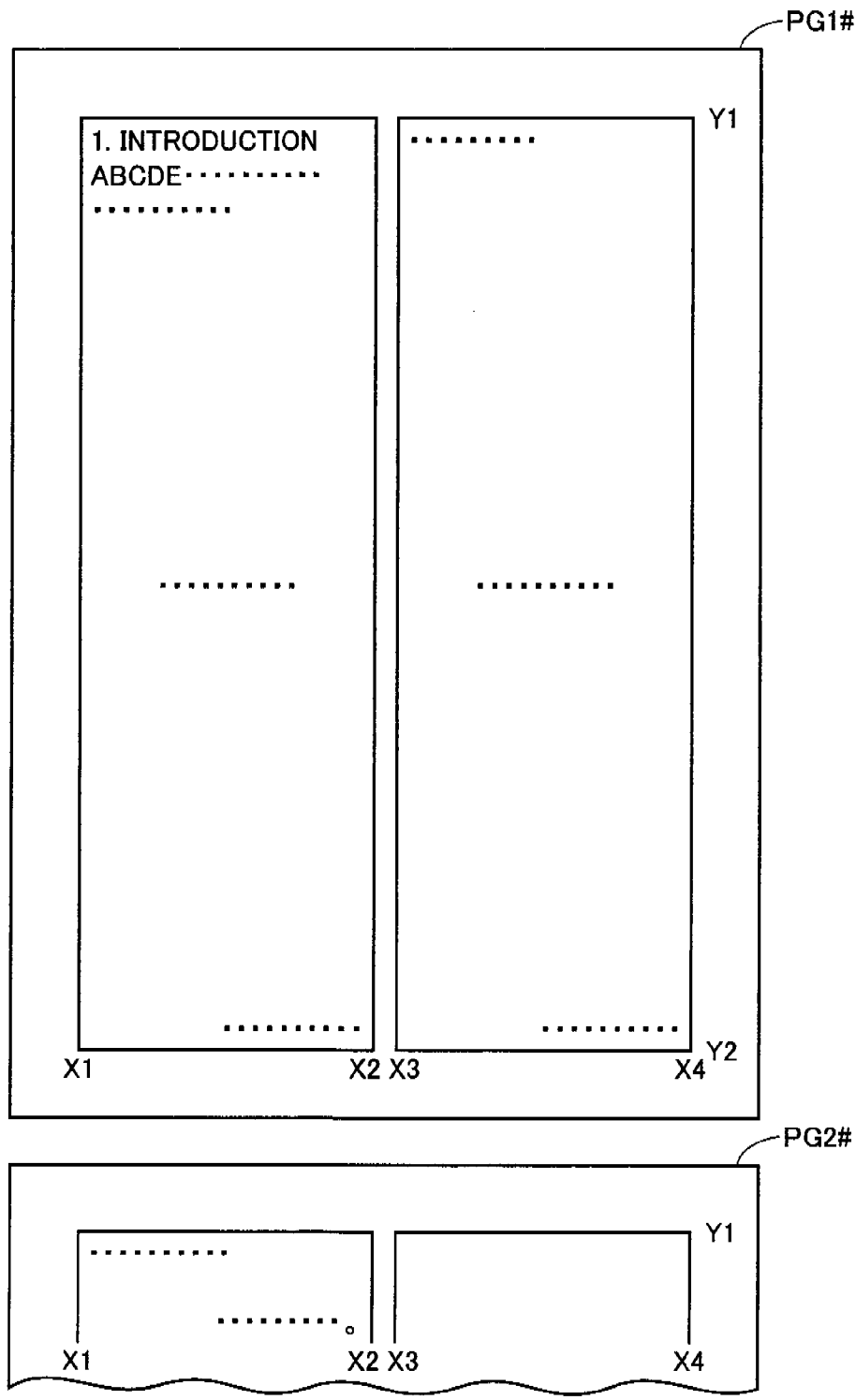
FIG. 8 is a view to describe a content region determined in step S4 in FIG. 7.

FIG. 8 shows content regions (X1, Y1)–(X2, Y2), (X3, Y1)–(X4, Y2) set in each page PG1# and PG2# of the inputted document image.

The "content region" means a region corresponding to one paragraph on the page, and it is set to the same position with respect to each page. The content region can be acquired by existing various methods.

For example, a projection histogram is generated in a vertical direction for a concentration image of the page, and horizontal positions X1, X2, X3, and X4 of the content region are obtained from the position having the lower total number of the concentration. Similarly, a projection histogram is generated in a lateral direction, and vertical start and end positions Y1 and Y2 of the content region are obtained.

Then, image analysis unit 16 determines line regions (step S6). The line region can be acquired by existing various methods. For example, a projection histogram is generated in a lateral direction for the concentration image of the content region, and positions of upper and lower ends in each line region can be obtained from the position having the lower total number of the concentration.

Then, image analysis unit 16 determines the character string element regions (character string element determining process) (step S8). The character string element region is acquired by integrating the line regions. Image analysis unit 16 controls the integration using the size of a right margin in each line region and an end-of-line character kind.

With reference to a flowchart in FIG. 9, a description will be made of the character string element determining process according to the embodiment of the present invention.

Figure 9:
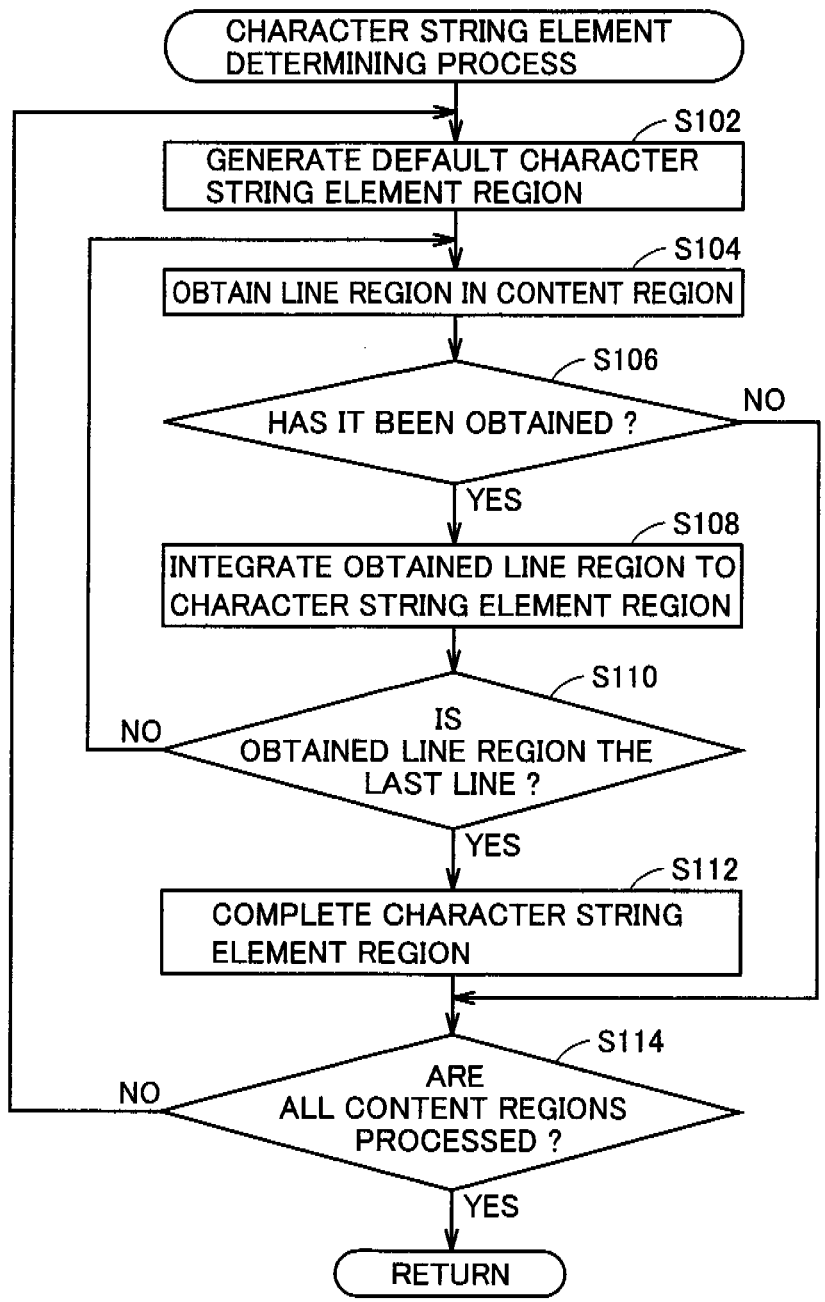
FIG. 9 is a flowchart showing a character string element determining process in the embodiment of the present invention.

Referring to FIG. 9, one default character string element region is generated first (step S102). Then, one unprocessed line region is obtained according to the reading order (step S104). More specifically, the line to be obtained is positioned uppermost content region having a small page number and positioned on the left.

Then, it is determined whether or not the line region has been obtained in step S104 (step S106). When there is no unprocessed line region, it is determined that the region has not been obtained (NO in step S106), the process proceeds to step S114.

Meanwhile, when the line region has been obtained (YES in step S106), the obtained line region is integrated into the character string element region (step S108).

Then, image analysis unit 16 determines whether or not the obtained line region is the last line (step S110). Mores specifically, it is determined whether the right margin of the obtained line region is more than a predetermined value or whether the end-of-line character kind is a period. The predetermined value of the right margin is set to a height of the character in the line region, for example. When it is determined that the obtained line region is the last line (YES in step S110), the process proceeds to step S112. When it is not (NO in step S110), the process returns to step S104, and the above steps are repeated.

In step S112, image analysis unit 16 completes the character string element region. After this process, the process proceeds to step S114.

In step S114, it is determined whether or not all of the content regions are processed. When there is an unprocessed content region (NO in step S114), the process returns to step S102. When there is no unprocessed content region (YES in step S114), the character string element determining process is completed.

Figure 10:
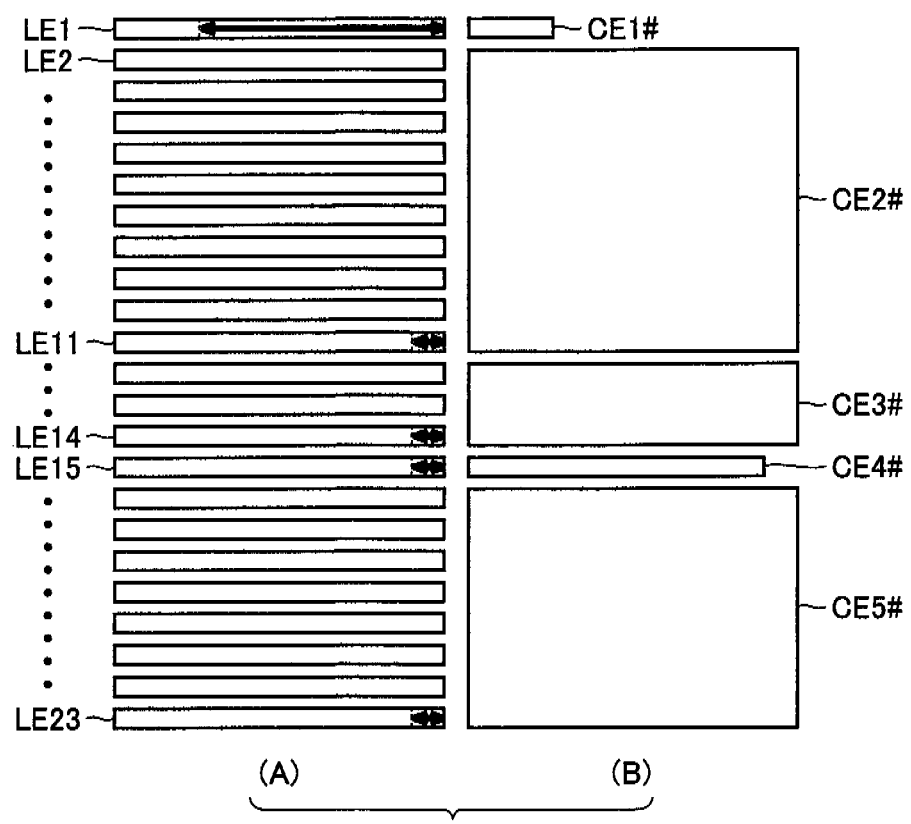
FIG. 10 is a view to describe a character string element region.

With reference to FIG. 10, an example of the character string element region will be described.

It is assumed that FIG. 10(A) shows a part of the line regions determined in step S6 in FIG. 7. FIG. 10(B) shows the determined result of the character string element regions performed for the line regions shown in FIG. 10(A).

Line regions (shown by "LE" in the drawing) 1, 11, 14, 15, and 23 are determined to have the right margin in step S110. Therefore, line regions 1 and 15 independently constitute character string element regions (shown by "CE" in the drawing) 1# and 4#, respectively. In addition, line regions 2 to 11, 12 to 14, and 16 to 23 are integrated in a vertical direction and character string element regions 2#, 3#, and 5# are generated, respectively.

When the character string element region have the right margin, a region excluding the right margin is set as the character string element region.

Referring to FIG. 7 again, when the character string element determining process is completed, classification unit 161 of image analysis unit 16 classifies the character string element regions into a large region and a small region (step S10). More specifically, an area of each character string element region, an average character height in the entire document, and an average width of the content region in the entire document are calculated, for example. When the area of the character string element region is larger than the value obtained by "the average character height in the entire document"×"the average width of the content region of the entire document"×2, that character string element region is determined as the large region, and otherwise determined as the small region.

While the area of the document region, the document region is used in classifying the large region and the small region, a feature quantity such as the height, the width, the line number and/or character number may be used in the classification.

Figure 11:
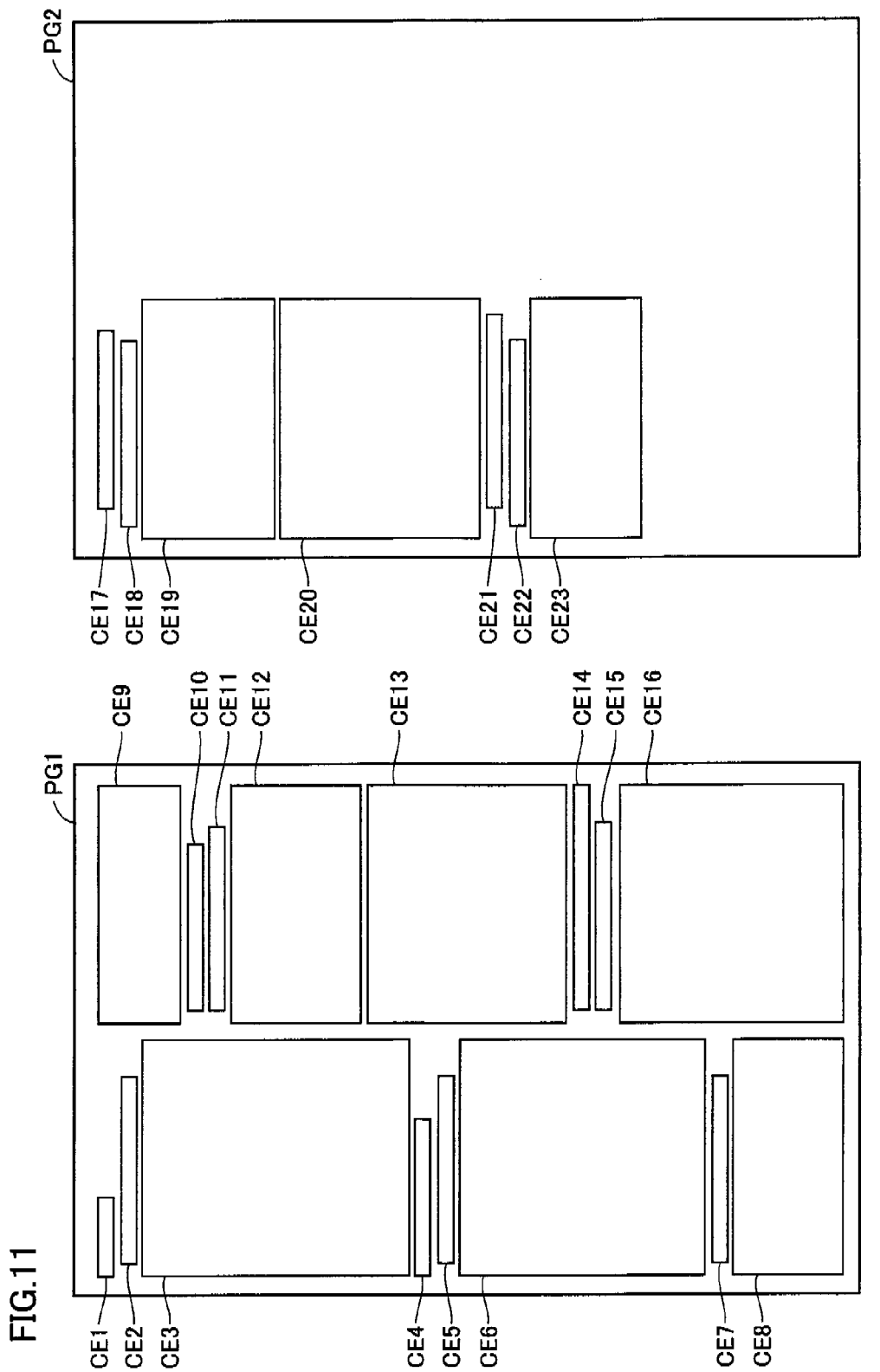
FIG. 11 is a view showing an example of the character string element region generated by the page in the embodiment of the present invention.
Figure 12:
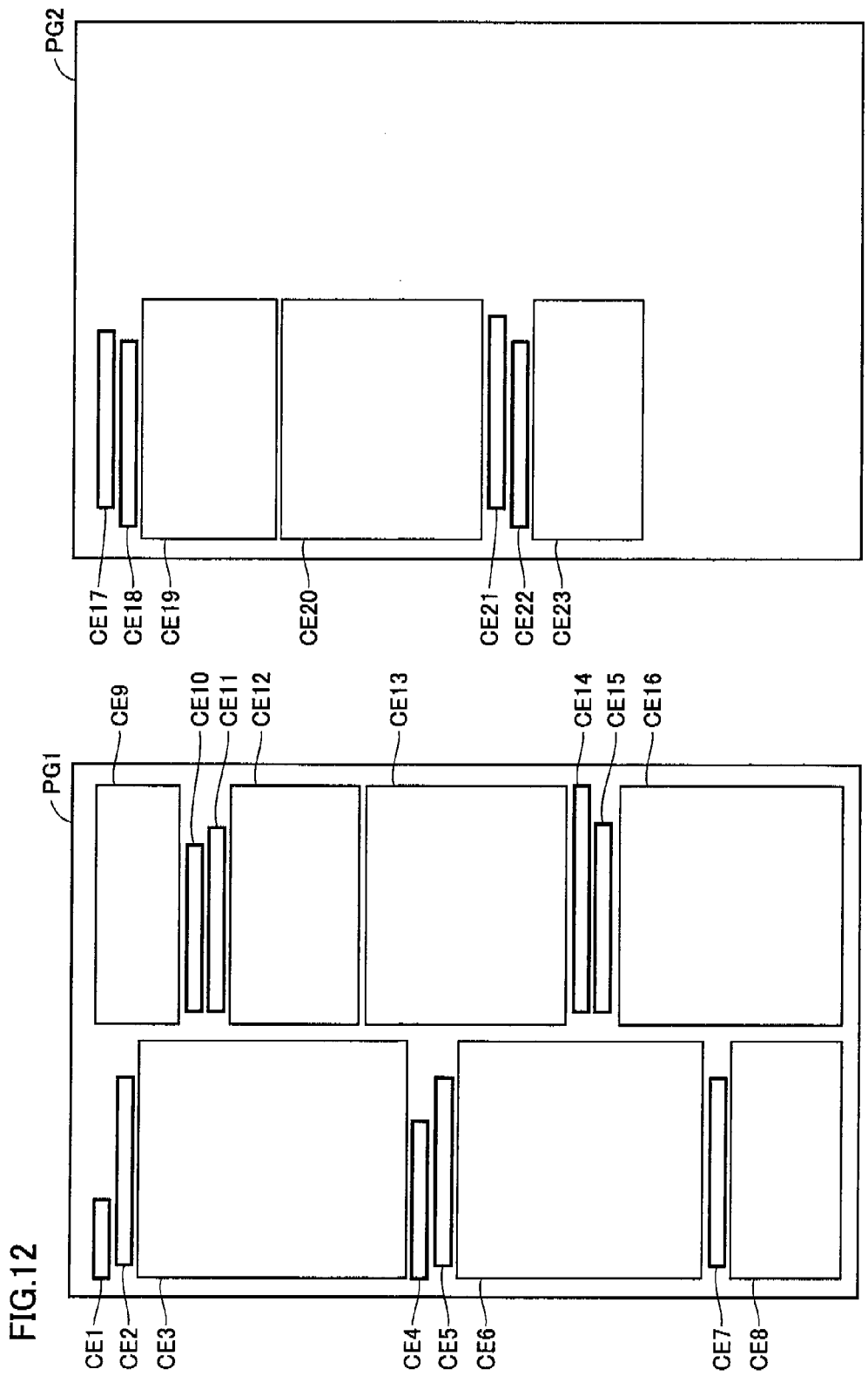
FIG. 12 is a view showing a classified result to a large region and a small region in the character string element region shown in FIG. 11.

With reference to FIGS. 11 to 13, such classifying process will be described. FIG. 11 shows an example of the character string element regions generated in each page.

Referring to FIG. 11, character string element regions 1 to 16 (CE1 to CE16) are generated on a page PG1. Further, character string element regions 17 to 23 (CE17 to CE23) are generated on a page PG2.

It is assumed that all regions 1 to 23 are uniform in character size, character color, and character height. Thus, it is assumed the head-of-line character kinds are as follows. That is, they are Chinese character in regions 1, 2, 4, 5, and 7, and hiragana (one kind of Japanese kana character) in regions 3, 8, 13, and 20, and katakana (one of Japanese kana character) in regions 6, 9, 12, 16, 19, and 23, and Roman character in other regions 11, 15, 18, and 22, and the number in other regions 10, 14, 17, and 21.

FIG. 12 shows a classified result between the large region and the small region for the character string element regions shown in FIG. 11.

Referring to FIG. 12, character string element regions 1, 2, 4, 5, 7, 10, 11, 14, 15, 17, 18, 21, and 22, shown with thick frames are classified as the small region. Other character string element regions 3, 6, 8, 9, 12, 13, 16, 19, and 20 are classified as the large region.

After classifying the character string element regions, candidate determination unit 162 of image analysis unit 16 determines whether the character string element region following the small region is the large region or the small region (step S12). That is, it is determined whether or not the small region, on its lower side, has the subsequent large region.

Candidate determination unit 162 determines that the small region having the following large region is the "index 1 candidate" (step S14). In addition, the large region subsequent to the index 1 candidate is related to the preceding index 1 candidate.

FIG. 13 shows the relationship between the index 1 candidate and the large region related to the index 1 candidate.

Referring to FIG. 13, among the character string element regions shown as the small regions in FIG. 12, character string element regions 2, 5, 7, 11, 15, 18, and 22 are determined as the index 1 candidates, Each character string element region determined as the index 1 candidate is also referred to as the "index 1 candidate region" in the following description. The large region subsequent to the index 1 candidate region is the related large region.

After the process in step S14, the index 1 candidate evaluating process is executed (step S16).

Referring to a flowchart in FIG. 14, a description will be made of the index 1 candidate evaluating process according to this embodiment of the present invention.

First, a feature of the index 1 candidate and a feature of the large region related thereto are compared with respect to each index 1 candidate to search a style type showing a certain level or more of difference (step S202).

According to this embodiment, the default style types are a line height, indent amount, head-of-line kind, and character color, for example.

Here, as for the "line height", a height of a first line of the region is used, for example. Here, as another method, the existing method of detecting the character height by estimating a region height, line number in the region, and baseline position of the character may be used.

As for the "indent amount", a distance from a left reference position of each paragraph (left side of the content region) to a left side of the character string element region is used.

As for the "head-of-line character kind", a first character kind (number, Japanese, or Roman character, for example) in a first line is used. Mother language and foreign language may be used in the character kind as the kind of language other than the distinction between the number and the language. In addition, a plurality of character forms (hiragana, katakana, and Chinese character, for example) included in the same language may be also employed as the character kind.

The character kind may be determined for a plurality of head lines in the first lines in view of a period, combination of parenthesis, and appearing order. Alternatively, a font and a difference in character kind ("1" and "I", for example) may be taken into consideration. Furthermore, the character kind frequently used as the index such as "Vol.", "chapter", and "·" may be discriminated. The determination of the head-of-line character kind can be made by referring to the character recognition result and dictionary data for determining the character kind (previously stored in memory 102).

As for the "character color", a color value of a line part of the character is used, for example. The character color may be determined by combining a background color.

Based on the comparison result, the style type capable of discriminating between the index 1 candidate and its related large region is set (step S204). It is noted that the priority has been previously set in the plurality of style types, and when it is determined that the plurality of discriminative style types exist, the style type having higher priority is used. Alternatively, reference data may be prepared to compare difference levels of the different style types and most different style type provided based on the reference data may be used. Here, the index 1 candidate having no significantly different style type is to be removed from the candidate.

With reference to FIG. 15, a description will be made of an example of the feature section set with respect to each index 1 candidate for an example of the discriminative style type when the default style type is used.

Referring to FIG. 15, the "indent amount" is set for above index 1 candidate regions 2, 5, 7, 11, 15, 18, and 22 as the style type capable of discriminating from their related large regions. Although there is a difference in head-of-line character kind, the indent amount is set because it has higher priority than the head-of-line character kind in this example.

The small region to be determined as the index, and the region to be compared are also expressed by a "region A" and a "region B", respectively as will be shown in the following table like in FIG. 15.

Then, a feature section capable of discriminating between the index 1 candidate and its related large region is provided for the discriminative style type (step S206).

FIG. 16 shows an example of the feature section set with respect to each index 1 candidate.

Referring to FIG. 16, the following feature sections are set for above index 1 candidates 2, 5, 7, 11, 15, 18, and 22, as the feature sections capable of discriminating from their related large regions. That is, as a section including the index 1 candidate, an indent amount of 1.5 or more but less than 1.5 (0.5, 1.5) is set, and as a section including the large region, an indent amount of less than 0.5 and more than 1.5 (other than the section of the index 1 candidate) is set.

Here, referring to FIGS. 17 to 19, a description will be made of one example of a method of setting the feature section.

Figure 17:
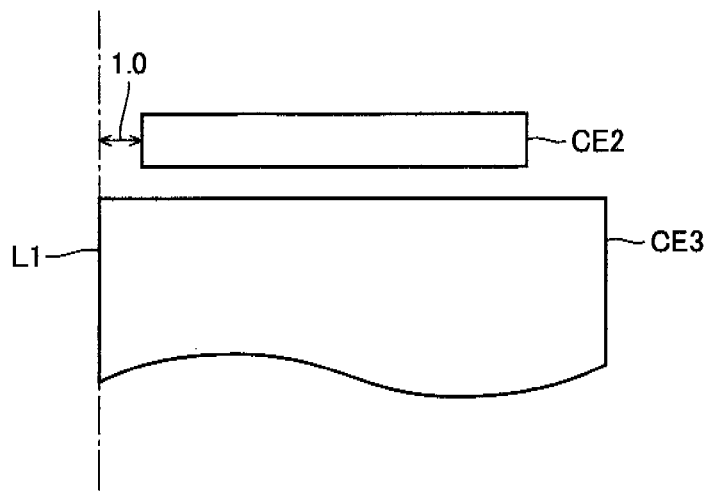
FIG. 17 is a view to describe a method of setting the feature section, and showing a difference in indent amount between the index 1 candidate and its related large region.

As shown in FIG. 17, when it is assumed that the indent amount of index 1 candidate region 2 (CE2) is 1.0 and the indent amount of related large region 3 (CE3) is 0. In this case, as shown in FIG. 18, a center value between the index 1 candidate and its related large region is calculated. Then, a section including the center value in the vicinity of the index 1 candidate is set as a "section including the index 1 candidate". That is, according to this embodiment, a predetermined range around the feature value of the index 1 candidate is set as the section including the index 1 candidate. The rest of it is set as a "section including the large region".

Figure 18:
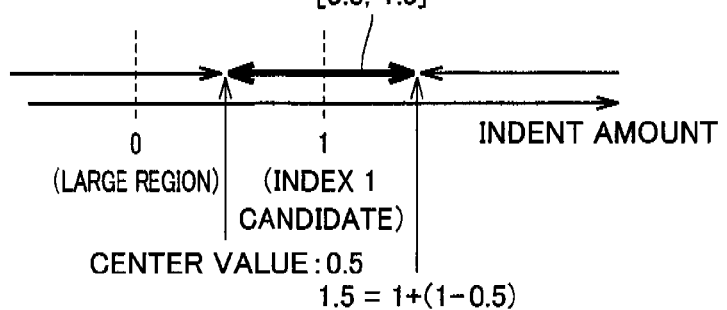
FIG. 18 is a view showing a method of setting the feature section when the discriminative style type is the indent amount.
Figure 19:
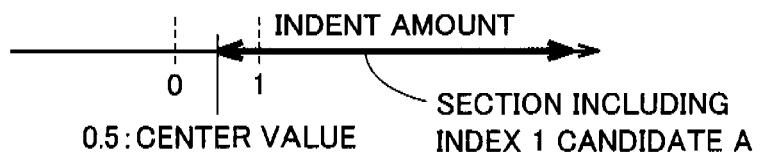
FIG. 19 is a view showing another method of setting the feature section when the discriminative style type is the indent amount.

As shown in FIG. 18, according to this embodiment, while the feature section is set depending on whether or not it is close to the feature of the index 1 candidate, the present invention is not limited to such setting method. For example, as shown in FIG. 19, the feature section may be set depending on whether it is close to the feature of the index 1 candidate or the feature of the related large region. More specifically, the center point (center value) between the feature value of the index 1 candidate and the feature value of the large region is set as a boundary. Thus, the section including the feature value of the index 1 candidate may be set as the "section including the index 1 candidate" and the rest of it may be set as the "section including the large region".

Referring to FIG. 14 again, with respect to each index 1 candidate, the regions are grouped by the section including the index 1 candidate (also referred to as the "first section" hereinafter) and the section including the large region (also referred to as the "second section" hereinafter) (step S208). More specifically, with the set feature section, the following numbers are counted. That is, a-i) the number of index 1 candidates included in the first section, a-ii) the number of large regions included in the first section, a-iii) the number of index 1 candidates included in the second section, and a-iv) the number of large regions included in the second section.

As a result, as shown in FIG. 20, among the index 1 candidates, the number of a-i) is seven (regions 2, 5, 7, 11, 15, 18, and 22), the number of a-ii) is zero, the number of a-iii) is zero, and the number of a-iv) is ten (regions 3, 6, 8, 9, 12, 13, 16, 19, 20, and 23).

Then, an index evaluation degree is calculated with respect to each index 1 candidate (step S210). The index evaluation degree is calculated from a following formula (1).

$$\text{Index evaluation degree} = ((Ka1 \times (Ca1-Ca2) - Ka2 \times (Ca3-Ca4)^* Ka3)/(Sa1+Sa2) \quad (1)$$

Wherein Ca1 represents the number of a-i), Ca2 represents the number of a-ii), Ca3 represents the number of a-iii), Ca4 represents the number of a-iv), Sa1 represent the total number of index 1 candidates, Sa2 represent the total number of large regions, Ka1 and Ka2 represent coefficients (both are 1), and Ka3 represents a coefficient (10).

As a result of calculation, the index 1 candidate having the index evaluation degree of a predetermined value or more is determined as the "index 1" (step S212). Here, the predetermined value is set to "5". As shown in FIG. 21, all of the index 1 candidates have the evaluation value of 10, so that each index 1 candidate is determined as index 1 (determined result is true).

After this process, the process returns to the main routine.

The index evaluation degree can be calculated with only the number of index 1 candidates from a following formula (2).

$$\text{Index evaluation degree} = ((Ka1 \times (Ca1) - Ka2 \times (Ca3))^* Ka3)/(Sa1) \quad (2)$$

Alternatively, the index evaluation degree can be calculated with only the number of large regions from a following formula (3).

$$\text{Index evaluation degree} = (Ka2 \times (Ca4))^* Ka3 - Ka1 \times (C2))/(Sa2) \quad (3)$$

Referring to FIG. 7 again, when the above index 1 candidate evaluating process is completed, a variable N is set to "1" (step S18). The variable N is provided to manage the arrangement order (hierarchy) based on the large region.

Based on the arrangement relationship, a small region having a related index N is determined as an "index N+1 candidate" among small regions other than the index 1 candidate (step S20). More specifically, when the small region positioned just before index N exists, it is set as the index N+1 candidate. When the index N+1 candidate does not exist (NO in step S22), the process proceeds to step S28. When the index N+1 candidate exists (YES in step S22), the process proceeds to step S24.

When the variable N=1, the index N+1 candidate is an "index 2 candidate".

Figure 22:
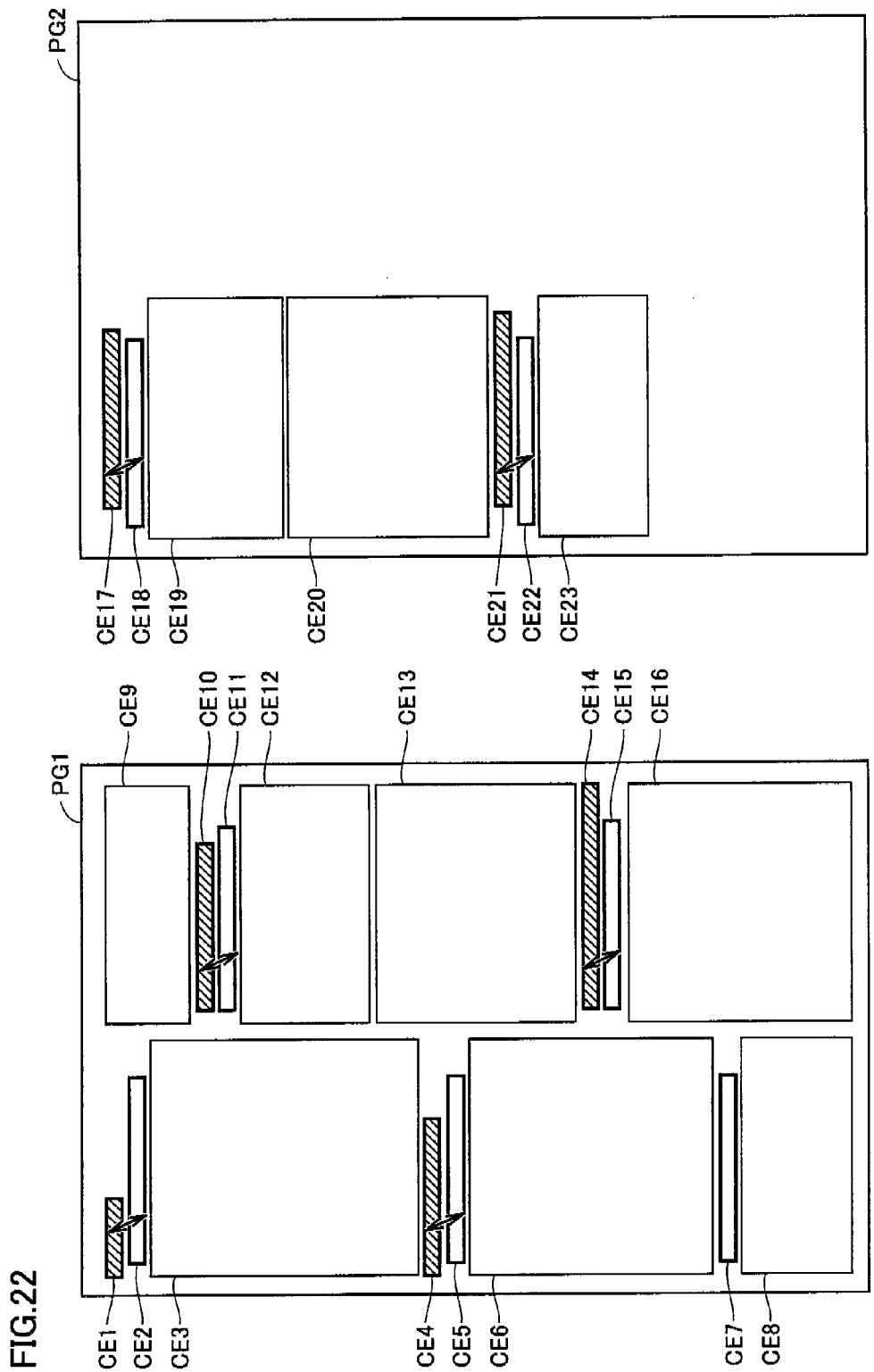
FIG. 22 is a view showing a relationship between a second candidate (index 2 candidate) and a first index (index 1 candidate determined as the index: index 1) related to the second candidate.

As shown in FIG. 22, the index 2 candidates (character string element regions 1, 4, 10, 14, 17, and 21) are hatched. The index 2 candidates exist just before (just above) regions 2, 5, 7, 11, 18, and 22 determined as the indexes 1.

When the variable N=2, since there is no index N+1 candidate, the process proceeds to step S28.

In step S24, an index N+1 candidate evaluating process is executed.

Figure 23:
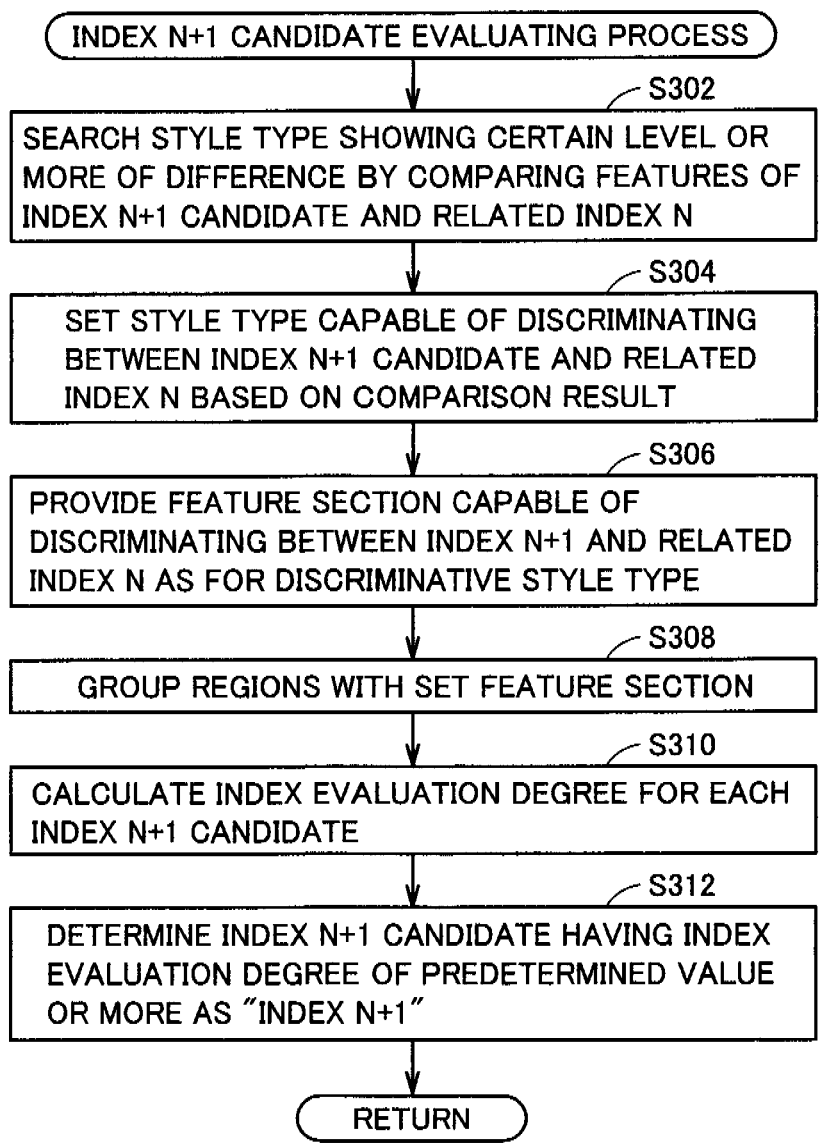
FIG. 23 is a flowchart showing an index N+1 candidate evaluating process according to the embodiment of the present invention.

Referring to FIG. 23, a description will be made of the index N+1 candidate evaluating process according to this embodiment. The index N+1 candidate evaluating process is also executed in the same manner as the above-described index 1 candidate evaluating process. Therefore, the process in common with the index 1 candidate evaluating process will not be described again among the steps.

First, a feature of the index N+1 candidate and a feature of index N related thereto are compared to search a style type showing a certain level or more of difference (step S302).

Then, the style type capable of discriminating between the index N+1 candidate and index N related thereto is set based on the comparison result (step S304). FIG. 24 shows a result example when N=1.

A feature section capable of discriminating between the index N+1 candidate and index N related thereto is provided for the discriminative style type (step S306). FIG. 25 shows a result example when N=1.

Then, with respect to each index N+1 candidate, the regions are grouped by the set feature section, that is, the section including the index N+1 candidate (also referred to as the "third section" hereinafter) and the section including related index N (also referred to as the "fourth section" hereinafter) (step S308). More specifically, with the set feature section, the following numbers are counted. That is, b-i) the number of index N+1 candidates included in the third section, b-ii) the number of indexes N included in the third section, b-iii) the number of index N+1 candidates included in the fourth section, and b-iv) the number of indexes N included in the fourth section.

FIG. 26 shows the grouped result.

Referring to FIG. 26, as for index 2 candidates 10 and 14, the number of b-i), that is, the number of index 2 candidates whose head-of-line character kind is the number is four (regions 10, 14, 17, and 21). The number of b-ii), that is, the number of index 1 whose head-of-line character kind is the number is zero. The number of b-iii), that is, the number of index 2 candidates whose head-of-line character kind is other than the number is two (regions 1 and 4), and the number of b-iv), that is, the number of index 1 whose head-of-line character kind is other than the number is eight (regions 2, 5, 7, 9, 11, 15, 18, and 22).

As for the index 2 candidates 1 and 4, the number of b-i), that is, the number of index 2 candidates included in the indent amount [−0.5, +0.5] is two (regions 1, and 4). The number of b-ii), that is, the number of indexes 1 included in the indent amount [−0.5, +0.5] is zero. The number of b-iii), that is, the number of index 2 candidates not included in the indent amount [−0.5, +0.5] is four (regions 10, 14, 17, and 21). The number of b-iv), that is, the number of index 1 not included in the indent amount [−0.5, +0.5] is eight (regions 2, 5, 7, 9, 11, 15, 18, and 22).

As for the index 2 candidates 17 and 21, the number of b-i), that is, the number of index 2 candidates included in the indent amount [1, +3] is two (regions 17 and 21). The number of b-ii), that is, the number of indexes 1 included in the indent amount [1, +3] is zero. The number of b-iii), that is, the number of index 2 candidates not included in the indent amount [1, +3] is four (regions 1, 4, 10, and 14). The number of b-iv), that is, the number of indexes 1 not included in the indent amount [1, +3] is eight (regions 2, 5, 7, 9, 11, 15, 18, and 22).

After the grouping process, an index evaluation degree is calculated with respect to each index N+1 candidate (step S310). The index evaluation degree may be calculated from a formula (4) similarly to the above formula (1).

$$\text{Index evaluation degree} = ((Kb1 \times (Cb1 - Cb2) - Kb2 \times (Cb3 - Cb4)) * Kb3)/(Sb1 + Sb2) \quad (4)$$

Wherein Cb1 represents the number of b-i), Cb2 represents the number of b-ii), Cb3 represents the number of b-iii), Cb4 represents the number of b-iv), Sb1 represent the total number of index N+1 candidates, Sb2 represent the total number of indexes N, Kb1 and Kb2 represent coefficients (both are 1), and Kb3 represents a coefficient (10).

Based on the calculation, the index N+1 candidate having the index evaluation degree of a predetermined value or more is determined as an "index N+1" (step S312). Here, the predetermined value is set to "4", for example.

As shown in FIG. 27, when the variable N=1, all of the index 2 candidates have the index evaluation degree of 4 or more, so that each index 2 candidate is determined as an index 2 (determined result is true).

After this process, the process returns to the main routine.

Referring to FIG. 7 again, after the index N+1 candidate evaluating process, the variable N is incremented by one (step S26) and the process returns to step S20. Then, the processes in steps S20 to S26 are repeated until there is no index N+1 candidate.

When it is determined that there is no index N+1 candidate, the regions determined as the indexes, that is, all of the character string element regions from index 1 to index N are outputted to bookmark data generation unit 17 in step S28.

Figure 28:
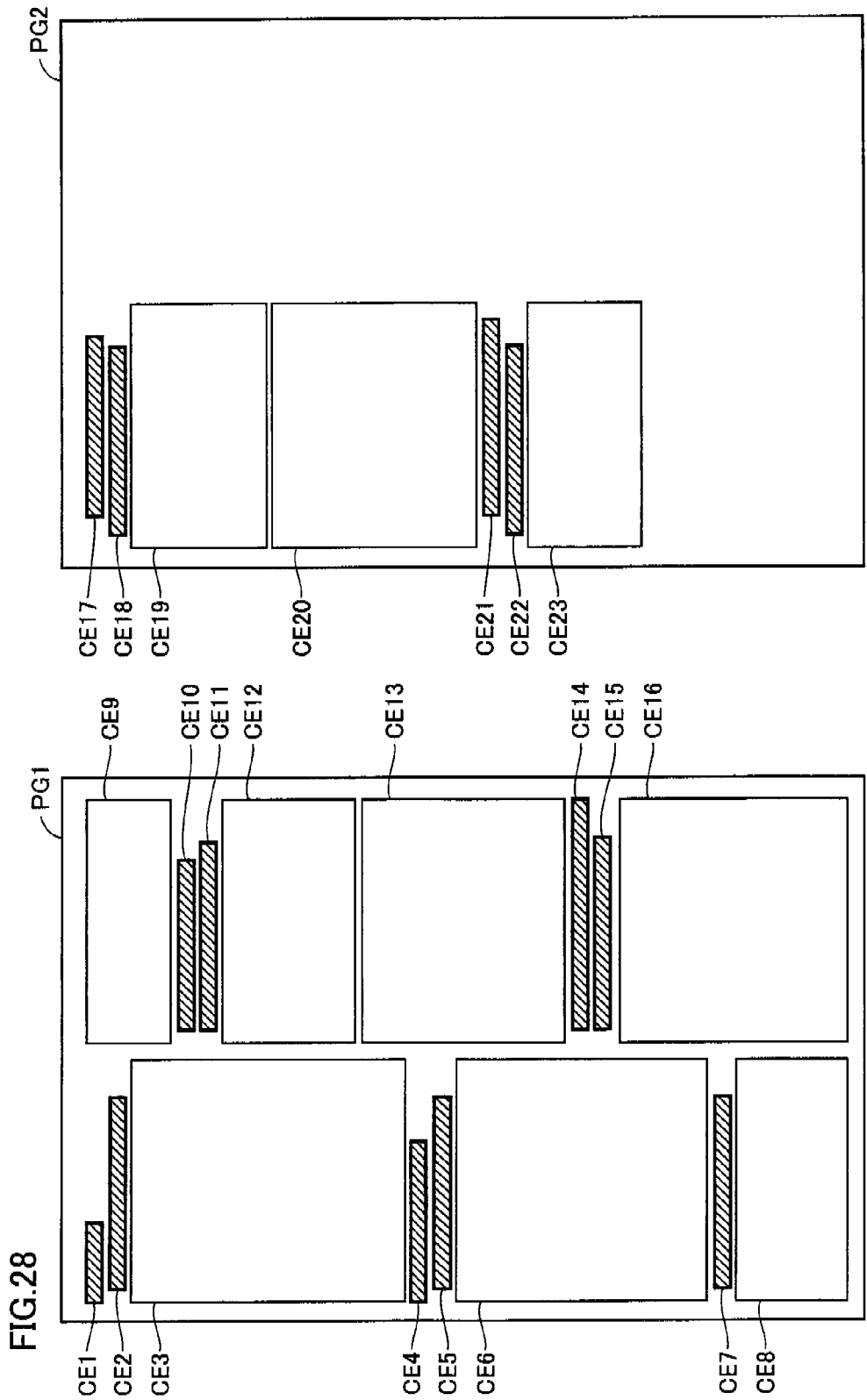
FIG. 28 is a view showing index regions extracted from a document including the character string element regions shown in FIG. 11 according to the embodiment of the present invention.

The regions hatched in FIG. 28 are index regions extracted from the document including the character string element regions shown in FIG. 11 (that is, indexes 1 to N).

Thus, bookmark data generation unit 17 generates the bookmark data shown in FIG. 6 to make the inputted index region function as the bookmark.

Then, the index region extracting process according to this embodiment of the present invention is completed.

As described above, according to this embodiment, the index regions can be appropriately extracted from the document having hierarchy indexes by grouping index N and index N+1 based on the set feature section. As a result, the PDF to which the appropriate bookmark is added can be created.

<Variation 1>

According to the above embodiment, the feature of the index N+1 candidate and the feature of index N are compared to set the feature section capable of discriminating between the index N+1 candidate and index N related thereto.

Meanwhile, according to this variation, the feature of the index N+1 candidate is compared with the related large region.

Figure 29:
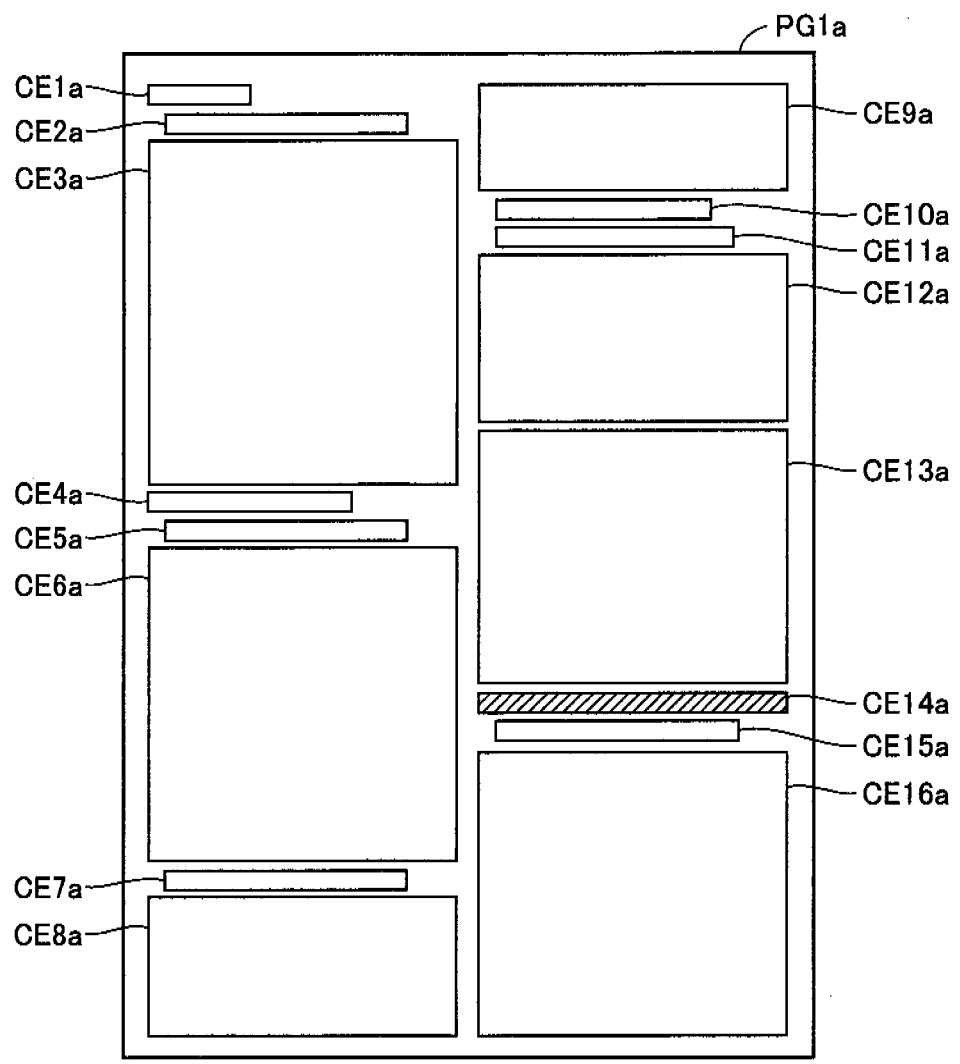
FIG. 29 is a view showing an example of character string element regions according to a variation 1 of the embodiment of the present invention.

According to this variation, as shown in FIG. 29, character string element regions CE1a to CE16a are extracted on page PG1a from data of an inputted document image.

It is assumed that the features of character string element regions CE1a to CE16a shown in FIG. 29 are the same as those of character string element regions CE1 to CE16 on page PG1 shown in FIG. 11 except for a region CE14a.

According to the example shown in FIG. 11, on page PG1, small region 14 and small region 15 have the same indent (1, 0), the head-of-line character kind of small region 14 is the number, and the head-of-line character kind of small region 15 is the Roman character.

Meanwhile, on page PG1a, small region 14a and small region 15a have different indent amounts, and the indent amount of small region 14a is "0". This is the same as that of large region 13*a* just above. In addition, the head-of-line character kind of small region 14*a* is hiragana.

In this example also, with reference to flowcharts in FIGS. 7, 14, and 23, the index region extracting process is executed.

Figure 30:
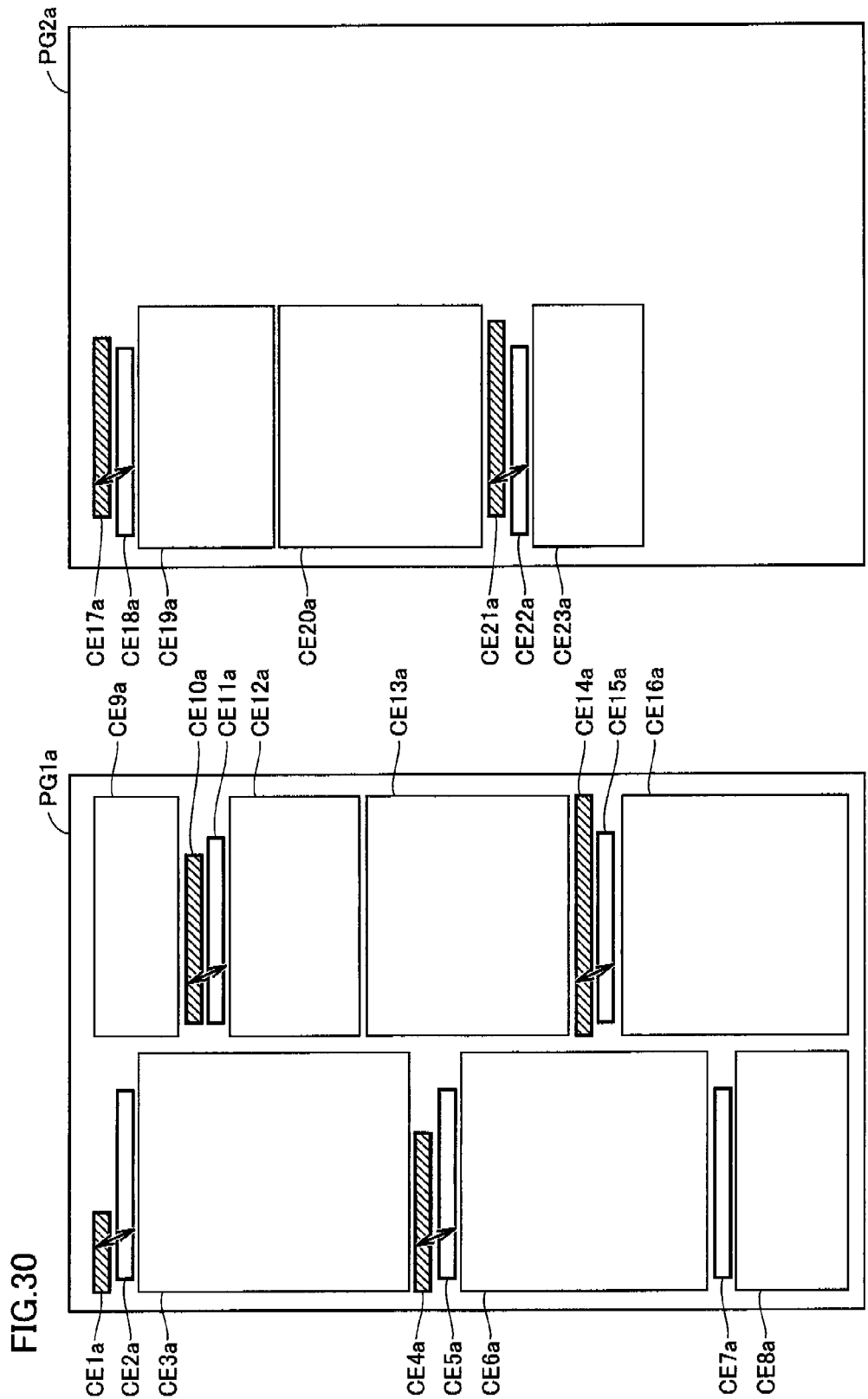
FIG. 30 is a view showing a relationship between an index 2 candidate and an index 1 related to the index 2 candidate according to the variation 1 of the embodiment of the present invention.

In the flowchart in FIG. 7, when N=1, the process of searching the index N+1 candidate is executed in step S20. FIG. 30 shows a relationship between the index 2 candidate and index 1 related thereto.

Referring to FIG. 30, the index 2 candidate is hatched and index 1 related to the index 2 candidate is expressed by an arrow in the drawing.

In step S302 in FIG. 23, similar to the above embodiment, the feature of the index 2 candidate and the feature of index 1 related thereto are compared and the style type showing a certain level or more of difference is searched. Thus, when the style type showing a certain level or more of difference exists, the style type is set to discriminate between the index 2 candidate and index 1 related thereto in step S304. FIG. 31 shows the result.

Here, it is assumed that the "Vol." frequently used as the head-of-line character is differentiated from the general language.

Referring to FIG. 31, according to this example, small region 14*a* as the index 2 candidate and small region 15*a* as index 1 are different in indent amount as well as head-of-line character kind. In this example, since the indent amount has higher priority than the head-of-line character kind, the indent amount is set as the style type capable of discriminating between index 2 candidate region 14*a* and index 1 region 15*a*.

Furthermore, according to this variation, the following process is performed between step S304 and step S306. That is, with respect to each index N+1 candidate, it is determined whether or not there is a style type capable of discriminating from the related large region back in the related large region. That is, the feature of the index 2 candidate and the feature of the large region related thereto are compared to search a style type showing a certain level or more of difference. Thus, when the style type showing a certain level or more of difference exists, the style type is set to discriminate between the index 2 candidate and the large region related thereto. FIG. 32 shows the result.

As shown in FIG. 32, as for small region 14*a* serving as the index 2 candidate, it is determined that there is no style type capable of discriminating from related large region 16*a*. Therefore, in this variation, such small region is removed from the index N+1 candidate.

Figure 33:
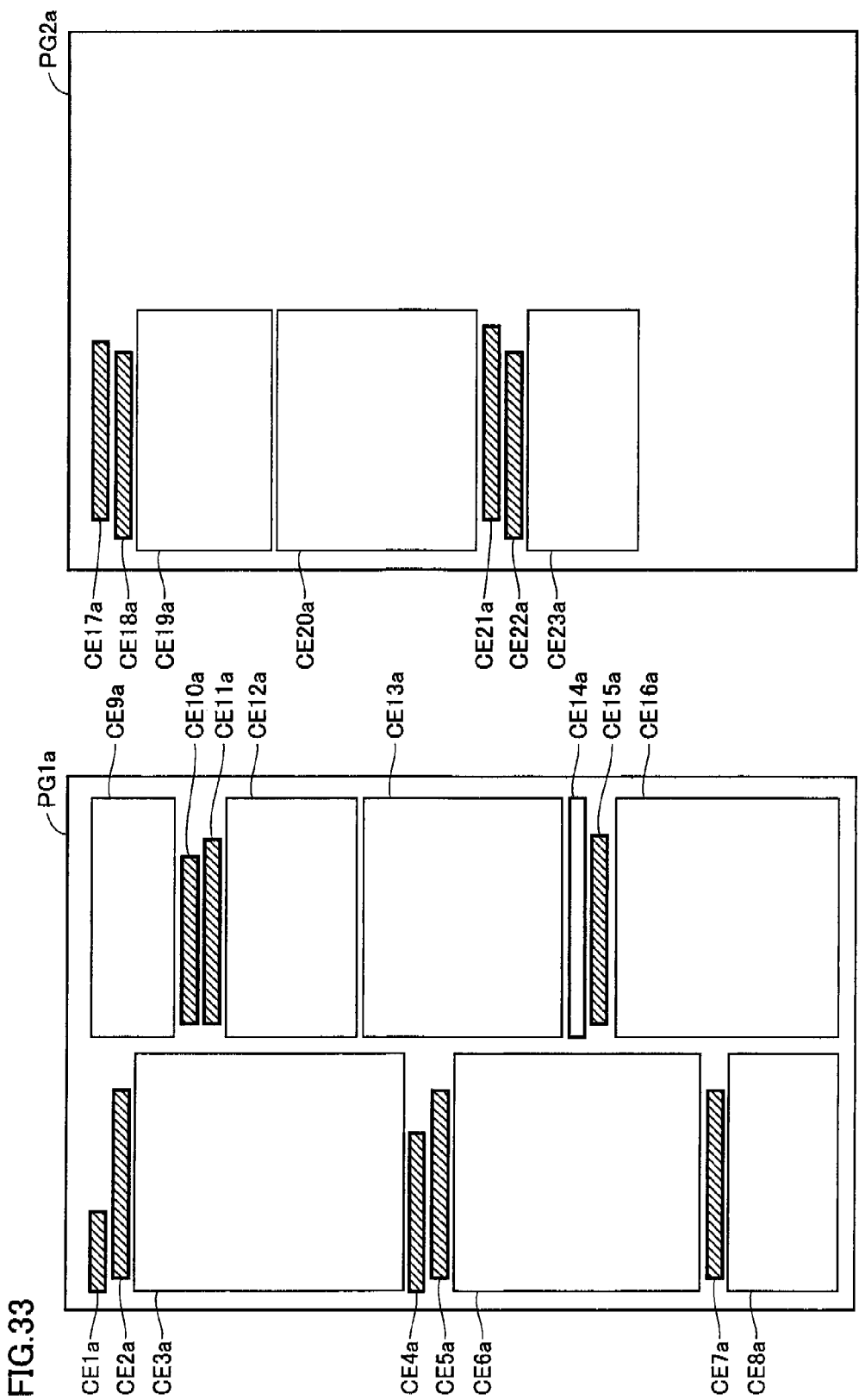
FIG. 33 is a view showing index regions extracted from a document including the character string element regions shown in FIG. 29 according to variation 1 of the embodiment of the present invention.

The hatched regions in FIG. 33 are the index regions extracted from the document including the character string element regions shown in FIG. 29 (that is, the indexes 1 to N) in this variation.

While region 14*a* is determined as index 2 by the flowchart in FIG. 28, region 14*a* is not determined as index 2 in this variation.

The difference in style between the index and text becomes clear as the positions are closer (distance is closer), and the logical role is expressed as the difference in style in many cases. Therefore, when there is no significant difference in feature between the index N+1 candidate and the large region appearing first among the subsequent regions, index N+1 is highly likely to be a part of the large region just before.

As described above, according to this variation, a part of the text is prevented from being erroneously determined as the index, by also being compared with the related large region, that is, the large region appearing first among the subsequent regions, in determining the index N+1 candidate.

<Variation 2>

The index evaluation degree as for the index N+1 candidate is calculated from the formula (4) in the above embodiment.

Meanwhile, this variation uses a simplified evaluation formula as compared with the above formula (4).

Figure 34:
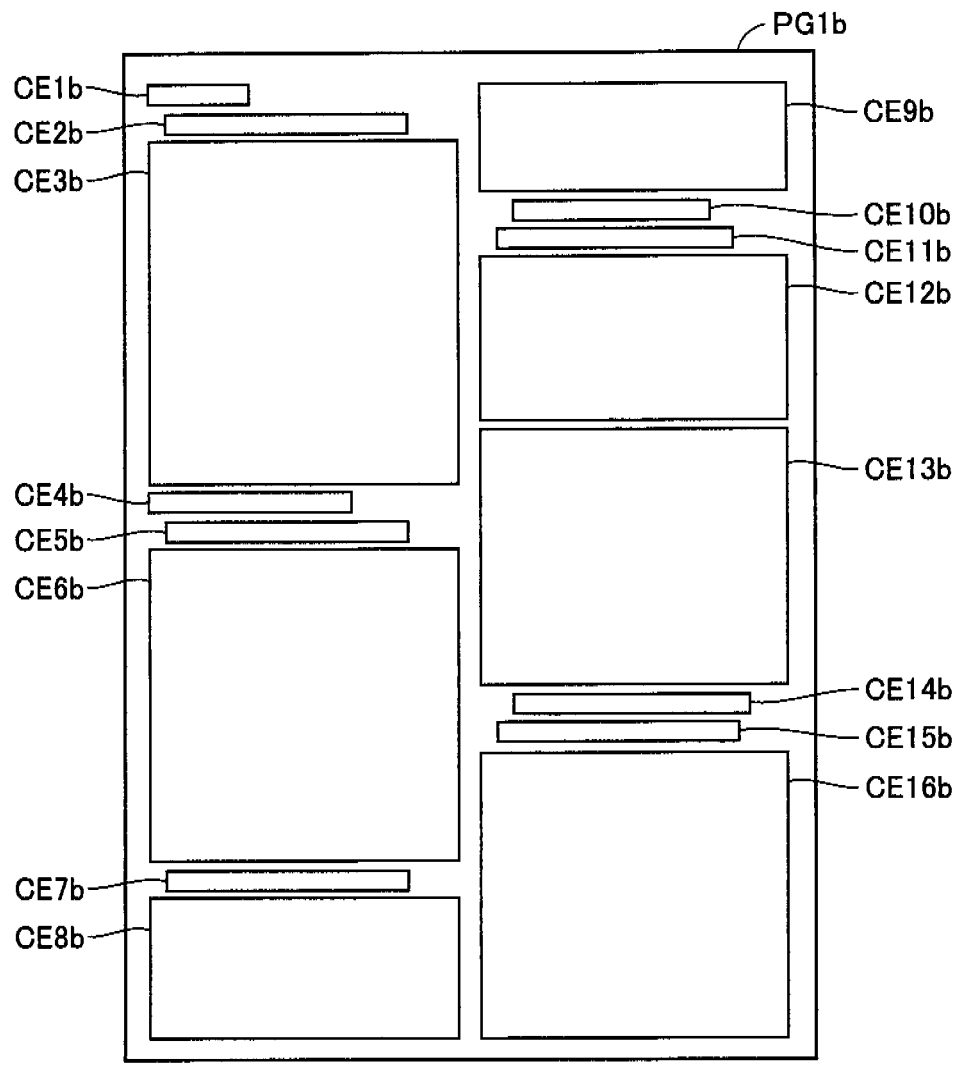
FIG. 34 is a view showing an example of character string element regions according to a variation 2 of the embodiment of the present invention.

According to this variation, as shown in FIG. 34, character string element regions CE1*b* to CE16*b* are extracted on a page PG 1*b* from data of inputted document image. In the document shown on page PG1*b*, character string element regions 1*b*, 4*b*, 10*b*, and 14*b* corresponding to the "index 2 candidate" are not uniform in indent amounts.

In this variation also, with reference to the flowcharts in FIGS. 7, 14, and 23, the index region extracting process is executed.

In the flowchart in FIG. 7, when N=1, the process of searching index N+1 is executed in step S20. FIG. 35 shows a relationship between the index 2 candidate and index 1 related thereto in this case.

In FIG. 35, the index 2 candidate is hatched and index 1 related to the index 2 candidate is expressed by an arrow in the drawing.

In step S302 in FIG. 23, similar to the above embodiment, the feature of the index 2 candidate and the feature of index 1 related thereto are compared to search a style type showing a certain level or more of difference. Thus, when the style type showing a certain level or more of difference exists, the style type is set to discriminate between the index 2 candidate and index 1 related thereto in step S304. FIG. 36 shows the result. Here, it is assumed that the difference in feature between them is only the indent amount.

Then, in step S306 in FIG. 23, a feature section is provided to discriminate between the index 2 candidate and index 1 related thereto as for the discriminative style type. FIG. 37 shows the result.

Then, in step S308 in FIG. 23, the grouping process is performed with the set feature section. FIG. 38 shows the grouped result.

FIG. 38 shows the counted result of the number of b-i) to b-iv) as described in the above embodiment.

Then, in step S310, the index evaluation degree is calculated with respect to each index 2 candidate.

According to this variation, the index evaluation degree is calculated only using the number of indexes 1 (index N). That is, the index evaluation degree is calculated from a formula (5) similarly to the above formula (3).

$$\text{Index evaluation degree} = ((Kb2 \times (Cb4)) * Kb3 - Kb1 \times (Cb2))/(Sb2) \quad (5)$$

Wherein Cb2 represents the number of the indexes N included in the third section (feature section including the index N+1 candidate) (the number of b-ii)), Cb4 represents the number of indexes N included in the fourth section (feature section including related index N) (the number of b-iv)), Sb2 represent the total number of indexes N, Kb1 and Kb2 represent coefficients (both are 1), and Kb3 represents a coefficient (10) as described above.

Based on the calculation by the evaluation formula (5), the index evaluation degree of index 2 candidate regions 1*b*, 4*b*, 10*b*, and 14*b* are all "10".

In step S312, the index 2 candidate having the index evaluation degree of a predetermined value or more is determined as "index 2". Here also, the predetermined value may be set to "4", for example. Therefore, as shown in FIG. 39, small regions 1*b*, 4*b*, 10*b*), and 14*b* as the index 2 candidates are all determined as indexes 2 (determined result is true).

Figure 40:
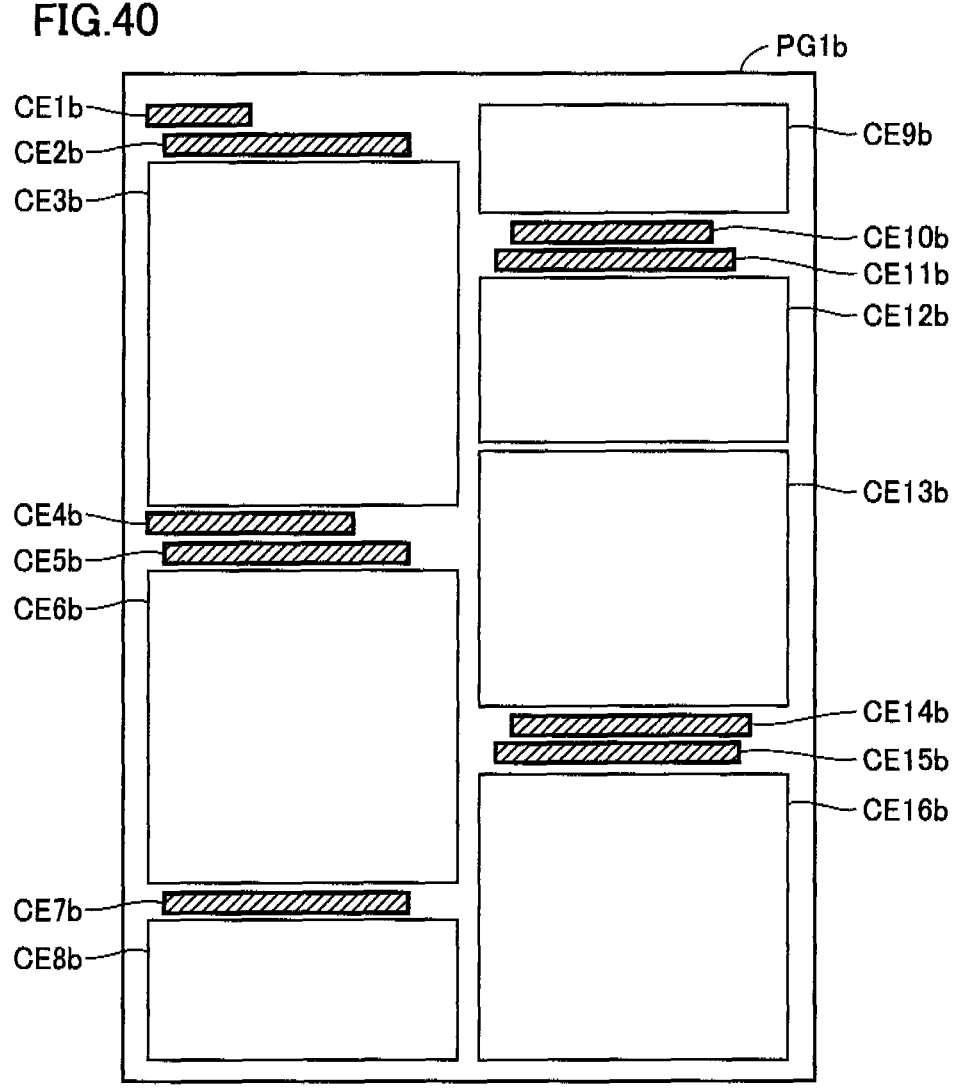
FIG. 40 is a view showing index regions extracted from a document including the character string element regions shown in FIG. 34 according to the variation 2 of the embodiment of the present invention.

In FIG. 40, the hatched regions are the index regions (that is, indexes 1 to N) extracted from the document including the character string element regions shown in FIG. 34, in this variation.

Thus, when it is determined whether or not the index N+1 candidate is the index, the index region can be appropriately extracted from the document which is not uniform in feature quantity, by only grouping index N by the set feature section.

The above formula (5) is especially suitable for the document which is uniform in feature in the text part. For the document uniform in index feature, the index evaluation degree may be calculated with numbers Cb1 and Cb3 regarding the index N+1 candidate from a formula (6) similarly to the above formula (2).

$$\text{Index evaluation degree} = ((Kb1 \times (Cb1)) - Kb2 \times (Cb3)) \\ * Kb3/(Sb1) \qquad (6)$$

Alternatively, the calculation of the evaluation degree may be simplified by removing the minus evaluation of numbers Cb1 and Cb3. That is, the index evaluation degree may be calculated from following formulas (7) to (9).

$$\text{Index evaluation degree} = ((Kb1 \times (Cb1) + Kb2 \times (Cb4)) \\ * Kb3)/(Sb1 + Sb2) \qquad (7)$$

$$\text{Index evaluation degree} = ((Kb1 \times (Cb1)3)/(Sb1) \qquad (8)$$

$$\text{Index evaluation degree} = ((Kb2 \times (Cb4)) * Kb3)/(Sb2) \qquad (9)$$

The index evaluation degree using the above formulas (7) to (9) is effective for the document which is low in style uniformity.

The formula to be used in calculating the evaluation degree may be selected by the user. In addition, the selection may be made before the index extracting process is executed or during the process, In this case, even when the index could not be extracted by a certain formula, the index can be determined by another formula until it can be appropriately extracted.

<Other Variations>

An index N+1 candidate group and an index N group are made in step S308 in FIG. 23 according to the above embodiment. However, there is a case where even the small region to be originally extracted as the index, that is, the small region positioned in the same hierarchy as index N+1 could not belong to same index N+1 candidate group. For example, when the small region is not determined as index 1 because of the difference in distance between the small region and the large region and the like, the small region is not also determined as index N+1. In order to solve such problem, it is searched whether there is a small region having the same feature as index N+1 after step S312 (to determine index N+1). Thus, when the small region exists, a process may be added to add the small region as a new index N+1.

Alternatively, according to the above embodiment, when the plurality of discriminative style types exist, one of them is selected according to the priority (in step S204 in FIG. 14 and in step S304 in FIG. 23). However, the discriminative style type may be combined (combination of AND conditions, for example). In this case, the sections including the index 1 candidate and the index N+1 candidate can be appropriately set.

Alternatively, according to the above embodiment, one feature section is set to one style type (in step S206 in FIG. 14 and in step S306 in FIG. 23). However, a plurality of different feature sections may be set to one style type. For example, when there is almost no difference in value in the index evaluation degree with respect to each index 2 candidate, the feature section may be changed. Thus, with the set feature section, the grouping of the regions and the calculation of the index evaluation degree may be executed (repeated), and the index determination (in step S212 in FIG. 14 and step S312 in FIG. 23) may be made using the index evaluation degree showing the biggest difference between the candidates.

Alternatively, in determining (calculating) the index evaluation degree, the number of the regions included in each feature section was used (in step S210 in FIG. 14 and step S310 in FIG. 23). However, a distance between the small region (region A) to be determined and another region may be also used. This is because the difference between the index and the text becomes clear as they are closer (distance is closer), so that the logical role is expressed as the difference in style in many cases. In other words, the difference from the distant region or the region on another page is not intended by a writer in some cases.

When it is assumed that the small region (region A) to be determined is the index N+1 candidate, the sum of the function of the distance from the index N+1 candidate may be used instead of the number of the regions, such that the Cb1 and Cb2 are highly counted when the distance is close.

In this case, Cb1# represents the sum of a distance function of the index N+1 candidate included in the feature section including the index N+1 candidate (region A), and Cb2# represents the sum of a distance function of index N included in the feature section including the index N+1 candidate (region A).

In this way, when the regions having the same feature are close in distance, the index evaluation degree is increased, so that the index evaluation can be made so as to fit human feeling.

In addition, the character string element region is completed when the last line is determined in the character string element region determining process in FIG. 9 (in steps S110 and S112). Meanwhile, by determining whether the feature (line height and the like) is changed in the next line, the character string element region may be completed when the feature (line height and the like) is changed in the next line.

While MFP1 has been described in the above embodiment and variations, the index region extracting process may be executed in personal computer PC as shown in FIG. 3, and the mobile terminal such as a mobile telephone. The index region extracting process in this embodiment can be executed in various kinds of computers having at least a processing device such as a CPU and a memory to store a document image and the like.

In addition, the index region extracting processing method (document image processing method) executed by the document image processing apparatus according to the present invention may be provided as a program. Such program can be provided as a program product when stored in an optical medium such as a CR-ROM (Compact Disc-ROM), and a computer-readable non-transitory recording medium such as a memory card. In addition, the program can be downloaded through the network.

Furthermore, the program according to the present invention may be executed by calling up a necessary module in a certain arrangement at certain timing, among program modules provided as one part of an operating system (OS) of the computer. In this case, the module is not provided in the program itself and the process is executed together with the OS. The program in which the module is not provided can be included in the program according to the present invention.

In addition, the program according to the present invention may be combined in a part of another program and provided. In this case also, a module provided in the other program is not provided in the program itself, and the process is executed together with the other program. The program combined in the other program can be included in the program according to the present invention.

The provided program product is installed in a program storage such as a hard disk and executed. In addition, the program product includes a program itself, and a recording medium storing the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A document image processing apparatus comprising:
a memory for storing a document image; and
a controller for controlling extraction of an index region from said document image, wherein said controller is configured to
i) classify a plurality of character string element regions constituting said document image into small regions and large regions,
ii) determine each small region positioned just before said large region according to a reading order as a first candidate, as a first determining process,
iii) determine at least one part of said first candidates as a first index, by performing an evaluating process to evaluate whether or not each said first candidate is an index, based on a difference in feature from the related large region, with respect to each said first candidate, as a first evaluating process,
iv) determine each small region positioned just before said first index according to the reading order as a second candidate, as a second determining process,
v) determine at least one part of said second candidates as a second index, by performing an evaluating process to evaluate whether or not said second candidate is the index, based on a difference in feature from the related first index, with respect to each said second candidate, as a second evaluating process, and
vi) extract the small regions determined as said first index and said second index, as said index region wherein
in said first evaluating process, said controller sets a first feature section for each said first candidate as for a style type different in feature from a corresponding related large region that represents said related large region corresponding to the intended first candidate among a plurality of style types, said first feature section including a feature of said intended first candidate region but not including a feature of said corresponding related large region,
groups into region groups at least one or both of the related large regions and the first candidates having the feature included in said set first feature section,
calculates a first index evaluation degree, based on a number of members of each region group with respect to each said first candidate, and
determines whether or not a logical element of each said first candidate is the index, based on said calculated first index evaluation degree, and
in said second evaluating process, the controller sets a second feature section for each said second candidate as for a style type different in feature from a corresponding related first index that represents said related first index corresponding to the intended second candidate among said plurality of style types, said second feature section including a feature of said intended second candidate region but not including a feature of said corresponding related first index,
groups into region groups at least one or both of the related first indexes and the second candidates having the feature included in said set second feature section,
calculates a second index evaluation degree, based on a number of members of each region group with respect to each said second candidate, and
determines whether or not a logical element of each said second candidate is the index, based on said calculated second index evaluation degree.

2. The document image processing apparatus according to claim 1, wherein in said second evaluating process, said controller groups both of said related first indexes and said second candidates having the feature included in said second feature section, with respect to each said second candidate, and calculates said second index evaluation degree, based on the sizes of a first index group and a second candidate group.

3. The document image processing apparatus according to claim 1, wherein in said second evaluating process, said controller further groups at least one of the related first indexes and the second candidates having a feature not included in said second feature section, with respect to each said second candidate, and uses a size of each region group not included in said second feature section in calculating said second evaluation degree.

4. The document image processing apparatus according to claim 1, wherein said controller further changes said second feature section when there is no difference in value in said second index evaluation degree provided with respect to each said second candidate in setting said second feature section in said second evaluating process.

5. The document image processing apparatus according to claim 1, wherein said plurality of style types comprises any one of an indent amount, a justified line, distances from previous and next character string element regions, a character string decoration, a head character kind, an end character kind, a language type, a character size, a line height, a character interval, a font, a character decoration, a character color, and a background color.

6. The document image processing apparatus according to claim 1, wherein in said second evaluating process, said controller sets a predetermined range around a feature value of said intended second candidate as said intended second feature section.

7. The document image processing apparatus according to claim 1 wherein in said second evaluating process, said controller sets a boundary point between a feature value of said intended second candidate and a feature value of said corresponding related first index, and sets said second feature section so as to include the side of the feature value of said intended second candidate from said boundary point.

8. The document image processing apparatus according to claim 1, wherein
in said second evaluating process, said controller further compares features of the small region determined as said second index and other small regions, and determines the small region having a feature similar to that of said determined small region among said other small regions, as a new second index.

9. The document image processing apparatus according to claim 1, wherein
when said second index is extracted, said controller repeats said second determining process and said second evaluating process by replacing said second index with said first index.

10. The document image processing apparatus according to claim 1, wherein
in said second evaluating process, said controller compares features of the intended second candidate and the related large region regarding the related first index corresponding to said intended second candidate, with respect to each said second candidate, and removes the second candidate having a feature similar to the feature of said related large region, from the index candidate.

11. A document image processing method executed by a document image processing apparatus comprising a memory storing a document image, to extract an index region from said document image stored in said memory, and comprising the steps of:
classifying a plurality of character string element regions constituting said document image into small regions and large regions;
determining each small region positioned just before said large region according to a reading order as a first candidate;
determining at least one part of said first candidates as a first index, by performing a first evaluating process to evaluate whether or not each said first candidate is an index, based on a difference in feature from the related large region, with respect to each said first candidate;
determining each small region positioned just before said first index according to the reading order as a second candidate;
determining at least one part of said second candidates as a second index, by performing a second evaluating process to evaluate whether or not said second candidate is the index, based on a difference in feature from the related first index, with respect to each said second candidate; and
extracting the small regions determined as said first index and said second index, as said index region,
wherein said first evaluating process comprises
setting a first feature section for each said first candidate as for a style type different in feature from a corresponding related large region that represents said related large region corresponding to the intended first candidate among a plurality of style types, said first feature section including a feature of said intended first candidate region but not including a feature of said corresponding related large region,
grouping into region groups at least one or both of the related large regions and the first candidates having the feature included in said set first feature section,
calculating a first index evaluation degree, based on a number of members of each region group with respect to each said first candidate, and
determining whether or not a logical element of each said first candidate is the index, based on said calculated first index evaluation degree, and said second evaluating process comprises
setting a second feature section for each said second candidate as for a style type different in feature from a corresponding related first index that represents said related first index corresponding to the intended second candidate among said plurality of style types, said second feature section including a feature of said intended second candidate region but not including a feature of said corresponding related first index,
grouping into region groups at least one or both of the related first indexes and the second candidates having the feature included in said set second feature section,
calculating a second index evaluation degree, based on a number of members of each region group with respect to each said second candidate, and
determining whether or not a logical element of each said second candidate is the index, based on said calculated second index evaluation degree.

12. A computer-readable non-transitory recording medium having a recorded document image processing program comprising the steps of:
classifying a plurality of character string element regions constituting a document image into small regions and large regions;
determining each small region positioned just before said large region according to a reading order as a first candidate;
determining at least one part of said first candidates as a first index, by performing a first evaluating process to evaluate whether or not each said first candidate is an index, based on a difference in feature from the related large region, with respect to each said first candidate;
determining each small region positioned just before said first index according to the reading order as a second candidate;
determining at least one part of said second candidates as a second index, by performing a second evaluating process to evaluate whether or not said second candidate is the index, based on a difference in feature from the related first index, with respect to each said second candidate; and
extracting the small regions determined as said first index and said second index, as said index region wherein said first evaluating process comprises
setting a first feature section for each said first candidate as for a style type different in feature from a corresponding related large region that represents said related large region corresponding to the intended first candidate among a plurality of style types, said first feature section including a feature of said intended first candidate region but not including a feature of said corresponding related large region,
grouping into region groups at least one or both of the related large regions and the first candidates having the feature included in said set first feature section,
calculating a first index evaluation degree, based on a number of members of each region group with respect to each said first candidate, and
determining whether or not a logical element of each said first candidate is the index, based on said calculated first index evaluation degree, and
said second evaluating process comprises
setting a second feature section for each said second candidate as for a style type different in feature from a corresponding related first index that represents said related first index corresponding to the intended second candidate among said plurality of style types, said second feature section including a feature of said intended second candidate region but not including a feature of said corresponding related first index,
grouping into region groups at least one or both of the related first indexes and the second candidates having the feature included in said set second feature section,
calculating a second index evaluation degree, based on a number of members of each region group with respect to each said second candidate, and determining whether or not a logical element of each said second candidate is the index, based on said calculated second index evaluation degree.

* * * * *